(12) United States Patent
Takeda et al.

(10) Patent No.: US 11,765,747 B2
(45) Date of Patent: Sep. 19, 2023

(54) MANAGING PRIMARY CELL CROSS-CARRIER SCHEDULING

(71) Applicant: QUALCOMM Incorporated, San Diego, CA (US)

(72) Inventors: Kazuki Takeda, Tokyo (JP); Alberto Rico Alvarino, San Diego, CA (US); Wanshi Chen, San Diego, CA (US); Peter Gaal, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/849,892

(22) Filed: Jun. 27, 2022

(65) Prior Publication Data

US 2022/0330314 A1    Oct. 13, 2022

Related U.S. Application Data

(63) Continuation of application No. PCT/CN2019/130359, filed on Dec. 31, 2019.

(51) Int. Cl.
*H04W 72/23* (2023.01)

(52) U.S. Cl.
CPC ................... *H04W 72/23* (2023.01)

(58) Field of Classification Search
CPC .................................................. H04W 72/23
USPC .......................................................... 370/329
See application file for complete search history.

(56) References Cited

U.S. PATENT DOCUMENTS

| | | | |
|---|---|---|---|
| 2015/0280883 A1* | 10/2015 | Seo | H04L 5/0053 370/329 |
| 2017/0086173 A1 | 3/2017 | He et al. | |
| 2017/0111159 A1 | 4/2017 | Lee et al. | |
| 2018/0145815 A1* | 5/2018 | Takeda | H04W 72/04 |
| 2019/0261431 A1* | 8/2019 | Tsai | H04W 74/0841 |

FOREIGN PATENT DOCUMENTS

CN    110475356 A    11/2019

OTHER PUBLICATIONS

Ericsson: "Further RRC Impact Due to Dormancy Behaviour", Tdoc R2-1913531, 3GPP TSG-RAN WG2 #107bis, Chongqing, China, Oct. 14-18, 2019, Oct. 18, 2019 (Oct. 18, 2019) Sections 1-5, pp. 1-6.

(Continued)

*Primary Examiner* — Chi Tang P Cheng
(74) *Attorney, Agent, or Firm* — The Marbury Law Group/Qualcomm

(57) ABSTRACT

This disclosure provides systems, methods and apparatus, and computer programs encoded on computer storage media, for managing cross-carrier scheduling. In one aspect, a processor of a wireless device may determine whether downlink control information (DCI) received from a secondary cell schedules communications on a primary cell, and may determine cross-carrier scheduling of communications on the primary cell in response to determining that the DCI received from the secondary cell schedules communications on the primary cell. In another aspect, processor of a network device may schedule communications on the primary cell in the DCI of the secondary cell, and may perform cross-carrier scheduling of communications on the primary cell based on the DCI of the secondary cell.

28 Claims, 14 Drawing Sheets

(56) References Cited

OTHER PUBLICATIONS

International Search Report and Written Opinion—PCT/CN2019/130359—ISA/EPO—dated Sep. 27, 2020 11 pages.
ZTE Corporation: "Discussion on Low Latency SCell Activation", R1-1910109, 3GPP TSG RAN WG1 Meeting #98bis, Chongqing, China, Aug. 14-20, 2019, Aug. 20, 2019 (Aug. 20, 2019) sections 1-6, pp. 1-7.

* cited by examiner

MANAGING PRIMARY CELL CROSS-CARRIER SCHEDULING

CROSS-REFERENCE TO RELATED APPLICATIONS

This Patent Application claims priority to International Patent Application No. PCT/CN2019/130359 filed Dec. 31, 2019 entitled "MANAGING PRIMARY CELL CROSS-CARRIER SCHEDULING," and assigned to the assignee hereof. The disclosure of the prior Application is considered part of and is incorporated by reference in this Patent Application.

TECHNICAL FIELD

This disclosure relates generally to wireless devices, and more particularly to managing wireless devices to perform cross-carrier scheduling.

DESCRIPTION OF THE RELATED TECHNOLOGY

Communication systems may be configured to employ carrier aggregation (CA) to provide sufficient bandwidth to support high data rate communications. A CA system combines bandwidth from two (or more) distinct frequency bands, each referred to as a component carrier. Each component carrier may be scheduled differently. For example, component carriers for downlink control information, downlink data, uplink control information, and uplink data may each be scheduled independently, which is referred to herein as cross-carrier scheduling.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device. Some implementations may include determining whether downlink control information (DCI) received from a secondary cell schedules communications on a primary cell, and determining cross-carrier scheduling of communications on the primary cell based on the DCI received from the secondary cell in response to determining that the DCI received from the secondary cell schedules communications on the primary cell.

Some aspects may further include determining that the DCI received from the secondary cell schedules communications on the primary cell in response to determining that the DCI from the secondary cell includes a DCI format configured to schedule communications on the primary cell. Some aspects may further include determining that the DCI received from the secondary cell schedules communications on the primary cell in response to determining that the DCI from the secondary cell includes a Carrier Indication Field (CIF) configured to schedule communications on the primary cell.

Some aspects may further include determining that the DCI provides scheduling information for communications on the primary cell in response to determining that the DCI provides scheduling information for communications on one of a physical downlink shared channel (PDSCH) or a physical uplink shared channel (PUSCH) of the primary cell.

Some aspects may further include monitoring one or more of DCI formats 0_1, 0_2, 1_1, and 1_2 on the secondary cell, and determining that the DCI received from the secondary cell includes the CIF configured to schedule communications on the primary cell based on the information in the monitored DCI formats. Some aspects may further include monitoring one or more DCI formats on the secondary cell and monitoring common search spaces corresponding to DCI formats 0_0 and 1_0 for non-unicast communications on the primary cell. Some aspects may further include determining whether the secondary cell has been deactivated, and monitoring a DCI from the primary cell in response to determining that the secondary cell has been deactivated.

Some aspects may further include monitoring a control channel of the secondary cell for the DCI that schedules communications on the primary cell, in which the determining whether DCI received from the secondary cell schedules communications on the primary cell may include determining whether the DCI received from the secondary cell schedules communications on a primary cell based on the monitoring of the control channel of the secondary cell for the DCI that schedules communications on the primary cell.

In some aspects, determining cross-carrier scheduling of communications on the primary cell based on the DCI received from the secondary cell may include determining a schedule of unicast communications on the primary cell based on the DCI received from the secondary cell. Some aspects may further include monitoring a Type 1 common search space (Type1-CSS) on the secondary cell. Some aspects may further include configuring the wireless device not to monitor a DCI format of the primary cell with a CRC scrambled by the cell radio network temporary identifier (C-RNTI).

Some aspects may further include determining whether a second DCI from the primary cell schedules a retransmission on the primary cell, and receiving the retransmission on the primary cell in response to determining that a second DCI from the primary cell schedules a retransmission on the primary cell.

Some aspects may further include determining whether a second DCI from the secondary cell schedules a retransmission on the primary cell, and receiving the retransmission on the primary cell in response to determining that a second DCI from the primary cell schedules a retransmission on the primary cell.

Further aspects include a wireless device having a processor configured with processor-executable instructions to perform operations of any of the wireless device methods summarized above. Further aspects include a processor configured for use in a wireless device and configured with processor-executable instructions to perform operations of any of the wireless device methods summarized above. Further aspects include a wireless device having means for performing functions of any of the methods summarized above. Further aspects include a non-transitory processor-readable storage medium having stored thereon processor-executable instructions configured to cause a wireless device processor to perform operations of any of the methods summarized above. Further aspects include a network device for use in a wireless network implementing CA capabilities, the network device including a processor configured with processor-executable instructions to perform operations of any of the network device methods summarized above.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
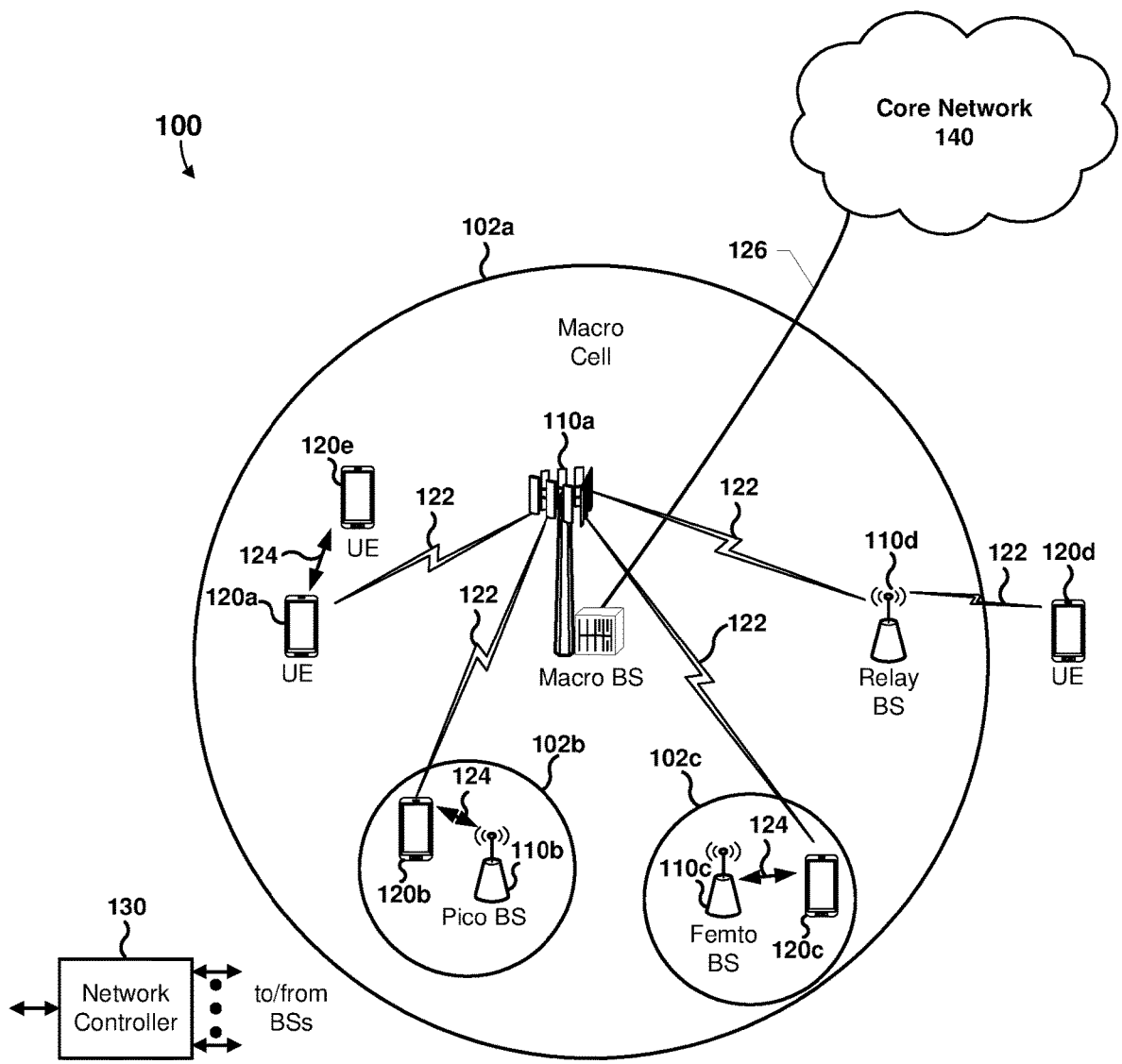
FIG. 1 shows a block diagram illustrating an example communication system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

In cross-carrier scheduling, a first cell (referred to herein as a scheduling cell) may provide scheduling information in a downlink control information (DCI) of a Physical Downlink Control Channel (PDCCH) for a second cell (referred to herein as a scheduled cell). The scheduling cell PDCCH provides DCI that schedules downlink and uplink data channels (i.e., the PDSCH and PUSCH) of the scheduled cell (for example, DCI format 0_0 or 0_1 for the scheduling of a PUSCH, or DCI format 1_1 for the scheduling of a PDSCH). Assuming that a primary cell (or "PCell") is the scheduling cell and a secondary cell (or "SCell") is a scheduled cell, the primary cell PDCCH includes a CIF that provides information identifying component carriers on which resources are scheduled. One of a group of SCells can be designated a primary SCell (PSCell). For dual connectivity (DC) operation, a mobile device may be configured with two cell-groups (CGs), where a first CG is designated as the master cell-group (MCG) which contains one or a set of serving cells including the PCell, and another CG is designated as a secondary cell-group (SCG) which contains one or a set of serving cells including the PSCell. For DC operation, each SCell belongs to either the MCG or the SCG. The PSCell may serve as an anchor carrier (or a PCell in the SCG) which can support common search space (CSS) and physical uplink control channel (PUCCH) transmission for the PCell and SCell(s) that belong to the SCG.

In conventional cross-carrier scheduling (for example, in conventional carrier aggregation), any cell (including the PCell and SCell(s)) may be configured as a scheduling cell that schedules SCell(s). For DC operation, the scheduling cell and a scheduled cell are typically in the same CG. In the SCG for DC operation, the PSCell and SCell(s) may be configured as a scheduling cell that schedules SCell(s). For a given scheduling cell in a cell-group, any scheduled cells are in the same cell-group. However, conventional cross-carrier scheduling does not provide a mechanism for an SCell to be a scheduling cell that schedules data on the PCell or the PSCell.

Various implementations enable cross-carrier scheduling by an SCell (i.e., a secondary cell) of communications on a PCell or PSCell (i.e., a primary cell) (i.e., a secondary cell may be the scheduling cell of the PCell or PSCell). In some implementations, the PDCCH of a secondary cell may be configured to schedule activity on a primary cell. Various implementations on the network side of a communication link may include scheduling, by a network device, communications on a primary cell in DCI of a secondary cell, and performing cross-carrier scheduling of communications on the primary cell based on the DCI of the secondary cell. In some implementations, the network device may schedule communications on the primary cell in a DCI format configured to schedule communications on the primary cell.

Various implementations on the wireless device side of the communication link may include determining, by a wireless device, whether DCI received from a secondary cell schedules communications on a primary cell, and determining cross-carrier scheduling of communications on the primary cell based on the DCI received from the secondary cell in response to determining that the DCI received from the secondary cell schedules communications on the primary cell. In some implementations, the wireless device may determine that DCI received from a secondary cell schedules communications on a primary cell in response to determining that the DCI from the secondary cell includes a DCI format configured to schedule communications on the primary cell. In some implementations, the wireless device may determine that DCI received from a secondary cell schedules communications on a primary cell in response to determining that the DCI from the secondary cell includes a Carrier Indication Field (CIF) configured to schedule communications on the primary cell. In some implementations, the wireless device may determine that DCI received from a secondary cell schedules communications on a primary cell in response to determining that the DCI provides scheduling information for communications on one of a physical downlink shared channel (PDSCH) or a physical uplink shared channel (PUSCH) of the primary cell. In such implementations, the DCI may include a CIF with a value indicating the scheduled cell is the primary cell.

For example, the wireless device may be configured to monitor a DCI format on a secondary cell configured to schedule the PDSCH or PUSCH on a primary cell. In some implementations, the DCI format may be a DCI format 0_1, 0_2, 1_1, or 1_2. In such implementations, the DCI format 0_1, 0_2, 1_1, or 1_2 on the secondary cell may include a CIF field with a value indicating a cell index of the primary cell.

In some implementations, the wireless device may monitor DCI formats 0_0 and 1_0 on the primary cell. In such implementations, configuration information, such as searchSpaceSIB1, searchSpaceOtherSystemInformation, and pagingSearchSpace in the PDCCH-ConfigCommon, may be configured by the primary cell, and the wireless device may monitor corresponding common search spaces (for example, Type 0, 0A, or 2 common search space (CSS) sets) on the primary cell. In some implementations, the wireless device may be configured to schedule unicast communications (on the PDSCH or PUSCH) by a DCI format. In some implementations, the wireless device may monitor a DCI format such as DCI format 0_0, 1_0, 0_1, 1_1, 0_2, or 1_2, on the secondary cell, and the scheduled unicast communications (on the PDSCH or PUSCH) may be on the secondary cell. In some implementations, the wireless device may monitor DCI formats 0_0 and 1_0 on the primary cell in Type 0, 0A, or 2 CSS sets on the primary cell.

In some implementations, the wireless device may be configured to monitor cross-carrier scheduling with a SCell as a scheduling cell (i.e., CIF field is present in a DCI format monitored on a SCell) and to not enable unicast communications on the primary cell scheduled by a DCI format on the primary cell such that wireless device may only determine scheduling of unicast communications on the primary cell by monitoring scheduling information in the PDCCH of the secondary cell. In particular, the wireless device may not monitor DCI format 0_0 or 1_0 with cyclic redundancy check (CRC) scrambled by a Cell-Radio Network Temporary Identifier (C-RNTI) in the Type3-CSS or in a wireless device-specific search space (USS) or other DCI format(s) (such as DCI format 0_1, 0_2, 1_1, and 1_2) in the USS in the primary cell when the wireless device is configured with cross-carrier scheduling with an SCell being scheduling cell for the primary cell. In some implementations, the network device may not configure the Type3-CSS or USS in the primary cell, in which case the wireless device does not expect configurations of Type3-CSS and USS in the primary cell. In some implementations, the wireless device may ignore or disregard configuration information that tells the wireless device to monitor a DCI format on the primary cell scheduling unicast communications (i.e., PDSCH or PUSCH) on the primary cell. The configuration is the Type3-CSS or USS on the primary cell.

In some implementations, the wireless device may monitor a Type1-CSS on the primary cell. The Type1-CSS may be configured by system information such as ra-SearchSpace in the PDCCH-ConfigCommon for the primary cell. When a wireless device is not configured with cross-carrier scheduling from an SCell to the primary cell, the wireless device may monitor DCI format 0_0 or 1_0 with CRC scrambled by C-RNTI on the Type1-CSS if the C-RNTI is provided by the Type3-CSS or USS is not configured on the primary cell. However, if a wireless device is configured with cross-carrier scheduling from an SCell to the primary cell, the wireless device may not monitor a DCI format with the CRC scrambled by the C-RNTI on the Type1-CSS in the primary cell that schedules unicast communications (i.e., PDSCH or PUSCH) on the primary cell.

In some implementations, the wireless device may monitor the Type1-CSS on the secondary cell. In such implementations, the Type1-CSS may be configured and monitored on the secondary cell when the secondary cell is configured to schedule unicast communications on the primary cell.

In some implementations, even if a wireless device is configured with cross-carrier scheduling from a secondary cell (such as an SCell) to the primary cell (such as a PCell or PSCell), the wireless device may be configured to determine scheduling of unicast communications by monitoring the primary cell. In particular, the wireless device may be configured to monitor the DCI (such as DCI format 0_0 or 1_0) with CRC scrambled by C-RNTI in the Type3-CSS or in USS in the primary cell when the wireless device is configured to monitor the PDCCH of the secondary cell that can schedule unicast communications (on the PDSCH or PUSCH) on the primary cell. In some implementations, this may affect the handling of data retransmissions. For example, if an initial transmission on the primary cell PDSCH or PUSCH has been scheduled by a DCI format on the secondary cell, a retransmission of the PDSCH or the PUSCH on the primary cell may be scheduled by the DCI (such as DCI format 0_0 or 1_0) on the primary cell (for example, in response to a negative acknowledgement (NACK) from the wireless device transmitted on the primary cell). In some implementations, if a wireless device is configured with cross-carrier scheduling from an SCell to the primary cell, if an initial transmission on the primary cell PDSCH or PUSCH has been scheduled by a DCI format on the secondary cell, the retransmission of the PDSCH or the PUSCH on the primary cell may be scheduled by the DCI (such as DCI format 0_1, 0_2, 1_1, or 1_2) only on the secondary cell (i.e., initial transmission and retransmission of the same unicast data are scheduled by the DCI format(s) on the same cell). Note that whether a scheduled PDSCH or PUSCH is an initial transmission or retransmission may be indicated by a New Data Indicator (NDI) field in the scheduling DCI. When a current DCI format schedules communications on a PDSCH or a PUSCH with a particular hybrid automatic request (HARQ) process identifier that has a different NDI field value than the last DCI format that schedules a PDSCH or a PUSCH with the same HARQ process identifier, this indicates that the current DCI schedules initial transmission of new data (otherwise re-transmission).

In some implementations, in addition to monitoring the DCI format 0_1, 0_2, 1_1, or 1_2, on a secondary cell configured to schedule the PDSCH or PUSCH on a primary cell, the wireless device may be configured to monitor DCI formats 0_0 and 1_0 on the secondary cell (as opposed to the primary cell). In such implementations, configuration information, such as searchSpaceSIB1, searchSpaceOtherSystemInformation, and pagingSearchSpace in the PDCCH-ConfigCommon, may be configured by the secondary cell, and the wireless device may monitor corresponding common search spaces (for example, Type 0, 0A, or 2 common search space (CSS) sets) on the secondary cell. In some implementations, the network device may monitor such common search spaces on the secondary cell at all times. In some implementations, the wireless device may monitor DCI formats 0_0 and 1_0 on the secondary cell for signaling parameters related to the communications on the primary cell. In some implementations, in response to determining that the secondary cell that is scheduling communications on the primary cell has been deactivated, the wireless device may monitor the control channel (such as the PDCCH) on the primary cell. In some implementations, the wireless device may be configured to monitor the control channel on the primary cell only when the secondary cell performing primary cell scheduling has been deactivated.

Particular implementations of the subject matter described in this disclosure can be implemented to realize one or more of the following potential advantages. Various implementations enable a wireless device and a network element greater efficiency and expanded capabilities to perform cross-carrier scheduling (such as or carrier aggregation). Cross-carrier scheduling may be useful to reduce signal interference in heterogeneous network deployments that employ carrier aggregation, especially where a heterogeneous combination of macro cells, small cells, relays, etc. is used. Cross-carrier scheduling also may be used to balance the loads from traffic and scheduling across different component carriers.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phone, wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, a global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium. A wireless device also may be referred to as an access terminal, a terminal, a mobile station, a wireless communication device, a handheld device, a subscriber unit, a station, etc.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (for example, ROM, RAM, Flash, etc.), and resources (for example, timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (for example, CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

FIG. 1 illustrates an example of a communications system 100 that is suitable for implementing various implementations. The communications system 100 may be a 5G NR network, or any other suitable network such as an LTE network.

The communications system 100 may include a heterogeneous network architecture that includes a communication network 140 and a variety of mobile devices (illustrated as wireless device 120a-120e in FIG. 1). The communications system 100 also may include a number of network devices (illustrated as base stations BS 110a, BS 110b, BS 110c, and BS 110d) and other network entities. A base station (network device) is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other mobile devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wireless or wired communication link 126. The wireless devices 120a, 120b, 120c may communicate with a base station 110a-110d over a wireless communication link 122.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more mobile devices (for example, illustrated as the wireless device 120a and the wireless device 120e) may communicate directly using one or more sidelink channels 124 (for example, without using a base station 110 as an intermediary to communicate with one another). For example, the mobile devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Base stations and wireless devices also may communicate over shared channels for frequency bands in which the wireless communication network does not schedule access to time-frequency resources. Referred to as unlicensed channels or unlicensed bands, multiple communication devices may transmit at any time that other devices are not using the channel/band. To avoid interfering with other wireless devices using the channel/band, a base station or wireless device follows a Listen-Before-Talk (LBT) procedure to monitor the channel/band for signals transmitted by others for a period of time, and may transmit if no other signals are detected during the LBT monitoring.

In some implementations, a base station 110a-110d or a wireless device 120a-120e may be configured to perform one or more techniques associated with a Channel Occupancy Time (COT) structure indication in an idle state or a connected state. For example, a processor in a wireless device 120a-120e may be configured to receive, from a base station 110a-110d, a set of COT structure indicators (COT-SIs) identifying a set of parameters of a COT for the mobile device, decode at least one COT-SI of the set of COT-SIs to determine at least one parameter of the set of parameters of the COT, and communicate with the base station 110a-110d in accordance with the at least one parameter or based on decoding the at least one COT-SI.

In some implementations, the wireless device 120a-120e may receive COT table configuration information. For example, the wireless device 120a-120e may receive a remaining minimum system information (RMSI) message identifying one or more small sized COT tables for use in obtaining partial COT structure information. In this case, a small sized COT table may be associated with less than a threshold size, such as less than a threshold quantity of entries, less than a threshold quantity of bits, or the like. In this case, the RMSI message may include configuration information for configuring the one or more COT tables, such as information identifying entries for the one or more COT tables, information identifying a concatenation for rows of the one or more COT tables, or the like. Additionally or alternatively, the RMSI also may include a PDCCH monitoring configuration, a DCI format for monitoring COT-SI, a size of a COT-SI PDCCH or DCI, a bit location in a DCI of information identifying a row concatenation, information identifying a quantity of bits per row index, information identifying a quantity of concatenated row indices, other bit indicators of other signaled parameters, a COT end symbol indicator, a COT pause start symbol indicator, a COT pause end symbol indicator, information relating to a triggered random access channel (RACH) process, CG-UL information, traffic class information, LBT information, COT acquisition information, or the like. For example, the wireless device 120a-120e may determine a control resource set (CORESET), a sub-band, a wide-band, a search space set, a set of aggregation levels and corresponding number of candidates, a radio network temporary identifier (RNTI), a time domain, a monitoring periodicity, a monitoring offset, a length of a DCI, or the like for monitoring for a COT-SI, a slot format indicator (SFI) DCI, or the like. In this case, an idle mode wireless device 120a-120e may be able to decode COT-SI bits to indicate one or more ordered entries of a first COT table and a second COT table, as described in more detail herein. In contrast, a connected mode wireless device 120a-120e may be able to decode COT-SI bits for the first COT table, the second COT table, and the third COT table.

Additionally, or alternatively, the wireless device 120a-120e may determine other information regarding a COT structure. For example, when operating in an unlicensed band, the wireless device 120a-120e may determine a COT duration. Additionally, or alternatively, the wireless device 120a-120e may determine a concatenation of one or more rows of a COT table, a CG-UL behavior, or the like, as described in more detail herein.

In some implementations, the wireless device 120a-120e may receive and decode a set of COT-SIs. For example, the wireless device 120a-120e may receive a first COT-SI identifying an index value for a first COT table, a second COT-SI identifying an index value for a second COT table, a third COT-SI identifying an index value for a third COT table, or the like. In this case, the COT-SIs may be bit indicators of a DCI received when monitoring for a PDCCH. In some implementations, the wireless device 120a-120e may determine one or more parameters for communicating with the BS 120a-120e based on the set of COT-SIs. For example, wireless device 120a-120e may determine an LBT type based on whether a transmit occasion is inside or outside of an acquired COT. In another example, the COT-SI may trigger or enable a RACH occasion within the acquired COT for an idle mode wireless device 120a-120e to transmit a RACH. In some implementations, the first COT-SI may include information identifying a COT end symbol, a COT duration (which may be implemented as a remaining COT duration indicator), a first COT pause start symbol, a first COT pause end symbol, a second COT pause start symbol, a second COT pause end symbol, or the like. In this case, the first COT-SI may explicitly identify a remaining COT duration and a COT pause indicator in a DCI. In some cases, information identifying symbol locations, such as a COT end symbol identifier, first COT pause start symbol identifier, a first COT pause end symbol identifier, a second COT pause start symbol identifier, a second COT pause end symbol identifier, or the like, may be indicated as an offset from a current position.

In some implementations, the wireless device 120a-120e may receive and decode a set of COT-SIs based on a state of the wireless device. For example, an idle mode wireless device 120a-120e may decode COT-SIs for the first COT table and the second COT table and a connected mode wireless device 120a-120e may decode COT-SIs for the first COT table, the second COT table, and the third COT table. In some implementations, the wireless device 120a-120e may receive the COT-SIs via a single PDCCH. For example, the wireless device 120a-120e may receive multiple bit indicators in a single PDCCH for multiple COT tables. Additionally, or alternatively, the wireless device 120a-120e may receive the multiple bit indicators via multiple PDCCHs associated with different frequency resources, time resources, monitoring periodicities, monitoring configurations, or the like.

In some implementations, the COT-SIs and the corresponding COT tables may be arranged hierarchically. For example, the wireless device 120a-120e may receive multiple indicators relating to multiple COT tables, such as a set of three COT tables. In this case, the wireless device 120a-120e may receive increasing amounts of information regarding the COT structure as additional resources are available, rather than using a relatively large single resource to signal all information regarding the COT structure.

In some implementations, the wireless device 120a-120e may receive multiple COT tables in different incremental stages. For example, a wireless device may receive the first COT table and the second COT table through an RMSI and may receive the third COT table after connecting and via a wireless device specific RRC message. In another example, the first COT table may be stored, and the wireless device 120a-120e may receive a first part of the third COT table in the RMSI and a second part of the third COT table in a wireless device specific RRC after connecting. In this case, the first part of the third COT table may be the second COT table.

In some implementations, the wireless device 120a-120e may determine a particular set of information regarding the COT structure based on the first COT table. For example, with regard to the first COT table, the wireless device 120a-120e may determine whether each symbol in a slot is inside a COT or outside a COT without indicating whether a symbol is for UL or DL. In this case, a quantity of rows and entries of the first COT table may be relatively short, such as a set of 8 rows and a set of 14 columns, since the first COT table is configured through the RMSI which may be limited in size; however, the wireless device 120a-120e may receive an indicator via a DCI to concatenate a set of row indices. In this way, the wireless device 120a-120e is enabled to receive a single COT-SI index for the first COT table that identifies a COT structure for multiple upcoming slots. As another example, the first COT table may indicate, via a single row, whether multiple slots or symbols are inside a COT or outside a COT.

In some implementations, the wireless device 120a-120e may combine the COT-SI information regarding the first COT table with other COT information received with the COT-SI or separate from the COT-SI to determine a COT structure. For example, the wireless device 120a-120e may receive a COT duration indicator (which may be indicated using a remaining COT duration indicator), a COT pause indicator, or the like in a DCI to combine with information regarding whether a particular symbol or slot is inside a COT or outside a COT. In some implementations, the COT pause indicator may indicate a start of a COT pause, a length of a COT pause, an end of a COT pause, or the like. In some implementations, the COT pause indicator may use a particular identifier. For example, the wireless device 120a-120e may interpret an outside COT indication ("O" or "Out") disposed between multiple inside COT indications ("I's" or "In's") as a COT pause indicator. Additionally, or alternatively, the wireless device 120a-120e may receive an explicit COT pause indicator (which could be represented as "P" or "Pause"), a COT start symbol and end symbol identifier from which the wireless device 120a-120e can derive the COT pause, or the like.

In some implementations, the wireless device 120a-120e may receive a first COT-SI that explicitly includes a COT end symbol or a COT duration indicator (which may be a remaining COT duration indicator), a COT pause start symbol, and a COT end symbol. In this case, the wireless device 120a-120e may not receive the first COT table.

Additionally, or alternatively, with regard to a second COT table, the wireless device 120a-120e may determine whether a slot is assigned for downlink ("D"), assigned for uplink ("U"), flexibly assigned ("F"), included in a COT pause ("O" or "P"), or the like. In this case, the second COT table provides partial slot information, such as providing one of a slot level indication, a mini-slot level indication, a symbol-group level indication, or the like, rather than multiple levels of indication, thereby reducing resource utilization. In some implementations, the second COT table may identify a slot assignment for multiple slots with each index, but less than an entirety of a COT. In this case, the wireless device 120a-120e may receive a COT-SI DCI to concatenate multiple row indices to enable signaling of a greater portion of a COT or the entirety of the COT.

In some implementations, the second COT table may be a truncation of the third COT table. For example, the second COT table may include a subset of rows of the third COT table, such as the first one or more rows. In this way, a size limit for tables configured through RMSI may be observed. In some implementations, the wireless device 120a-120e may receive a COT-SI DCI for the second COT table that identifies a row that is not included in the second COT table, such as an index greater than a greatest index of the second COT table. In this case, the wireless device 120a-120e may determine that a set of slots are associated with a default configured assignment, such as an unknown assignment, and the wireless device may communicate in accordance with the default configured assignment. As another example, each row in the second COT table may include information identifying a length of a COT duration, a quantity of DL slots, a quantity of DL symbols, a quantity of flexible symbols, a quantity of UL symbols, a quantity of UL slots, or the like.

Additionally, or alternatively, with regard to a third COT table, the wireless device 120a-120e may determine an entirety of a COT structure at a symbol level. For example, the third COT table may include information identifying whether each symbol is assigned as a DL symbol, an UL symbol, a flexible symbol, or the like. In some implementations, the third COT table may be a slot format combination table that identifies a slot format for symbols of an indicated quantity of consecutive slots. In some implementations, information derived from the third COT table may override information derived from the second COT table. For example, when a symbol is identified as flexibly assigned based on the second COT table, the wireless device 120a-120e may determine that the flexible assignment is to be an UL assignment based on the third COT table.

In some implementations, the wireless device 120a-120e may receive other information in connection with the COT-SIs. For example, the wireless device 120a-120e may receive information identifying a size of a DCI, information identifying a position of bits identifying COT table indices within a DCI, a quantity of concatenated rows of a COT table, or the like. Additionally or alternatively, the wireless device 120a-120e may receive information identifying a current location with respect to a start of a COT, a traffic priority class of the COT, whether the base station 110a-110d or another wireless device 120a-120e acquired the COT, a dynamically triggered physical RACH (PRACH) resource information, a dynamically triggered PRACH enable or trigger message, LBT type for the COT, a CG-UL parameter, a two-stage grant resource and triggering information, or the like.

In some implementations, the wireless device 120a-120e may determine a particular CG-UL behavior based on the CG-UL parameter. For example, the wireless device 120a-120e may determine that CG-UL is allowed if a category type 4 LBT procedure is configured and a COT start is not yet detected. Additionally, or alternatively, when a COT start is detected but a COT-SI is not yet received, is not yet processed, or the like, the wireless device 120a-120e may cancel a CG-UL. Additionally, or alternatively, the wireless device 120a-120e may avoid canceling the CG-UL if a scheduled grant is not detected. Additionally, or alternatively, when at a time inside a COT and a COT-SI is detected and processed by the wireless device 120a-120e, the wireless device may cancel the CG-UL when a slot is assigned for DL. Additionally, or alternatively, the wireless device 120a-120e may refrain from canceling the CG-UL when the slot is assigned for UL, and may observe a signaled behavior associated with the CG-UL parameter when the slot is assigned as flexible slot.

In some implementations, rather than receiving a COT-SI, the wireless device 120a-120e may receive an explicit SFI for each slot of a COT. For example, the wireless device 120a-120e may receive a DCI conveying the explicit SFI that indicates a slot format for an entirety of the COT based on a stored table associated with an unlicensed spectrum frame structure. Based on the stored table being smaller than a slot format combination table, such as based on the unlicensed spectrum being associated with a maximum COT size of less than a threshold, a quantity of bits in the DCI to signal the COT structure is reduced. In this case, the wireless device 120a-120e may determine that the DCI conveys an explicit SFI based on a bit indicator in the DCI indicating that the DCI conveys the explicit SFI rather than one or more COT-SIs. In some implementations, the DCI may signal a COT table that includes a symbol representing slots that are not within a COT. In some implementations, the DCI may include an explicit COT duration indicator to enable the wireless device 120a-120e to determine the length of the COT.

In some implementations, the wireless device 120a-120e may decode one or more COT-SIs and may communicate in accordance with a COT structure identified by the one or more COT-SIs. Each COT-SI may include information about the TXOP, such as the remaining COT duration, start and length of pauses inside the TXOP, DL or UL slot indications of the slots in TXOP, sub-band usage indication of the TXOP, etc.

Some implementations may be implemented on a number of single processor and multiprocessor computer systems, including a system-on-chip (SOC) or system in a package (SIP).

Figure 2:
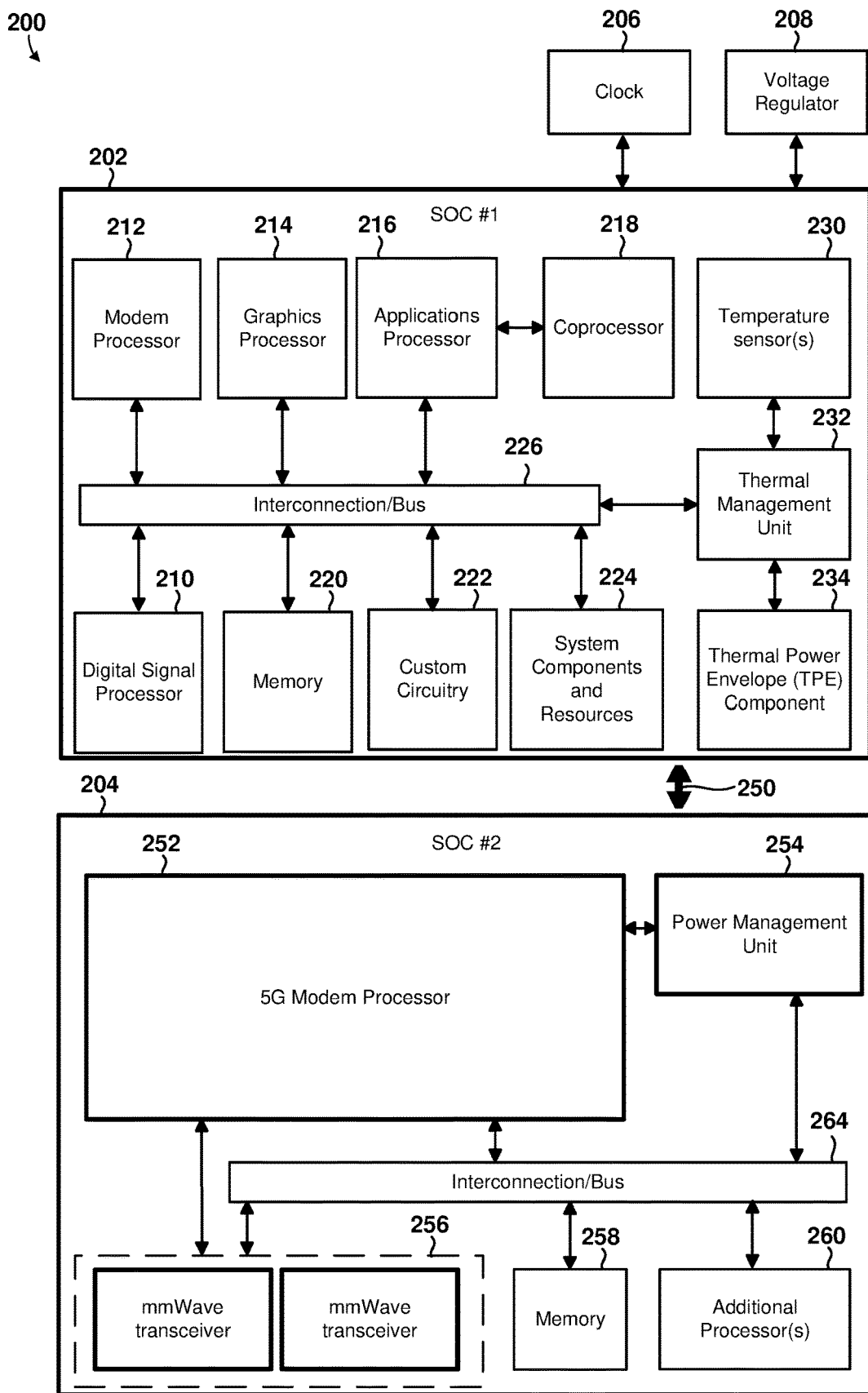
FIG. 2 shows a component block diagram of an example computing system.

FIG. 2 illustrates an example computing system or SIP 200 architecture that may be used in wireless devices or network devices implementing the various implementations.

With reference to FIGS. 1 and 2, the illustrated example SIP 200 includes a two SOCs 202, 204, a clock 206, and a voltage regulator 208. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
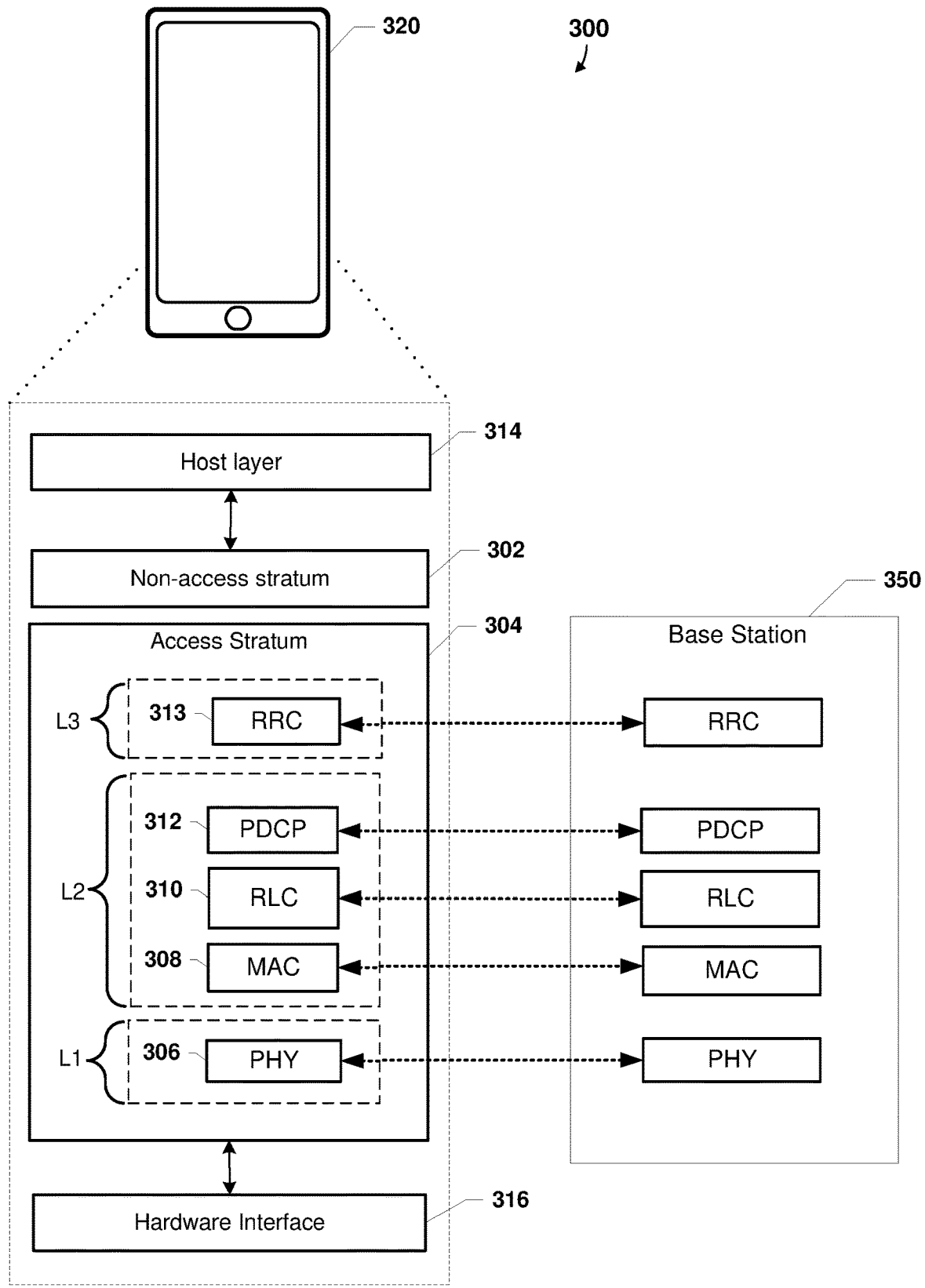
FIG. 3 shows a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as base station 110a-110d) and a wireless device 320 (such as any of the wireless devices 120a-120e). With reference to FIGS. 1-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the PDCCH and the PDSCH.

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more RF transceivers).

Figure 4A:
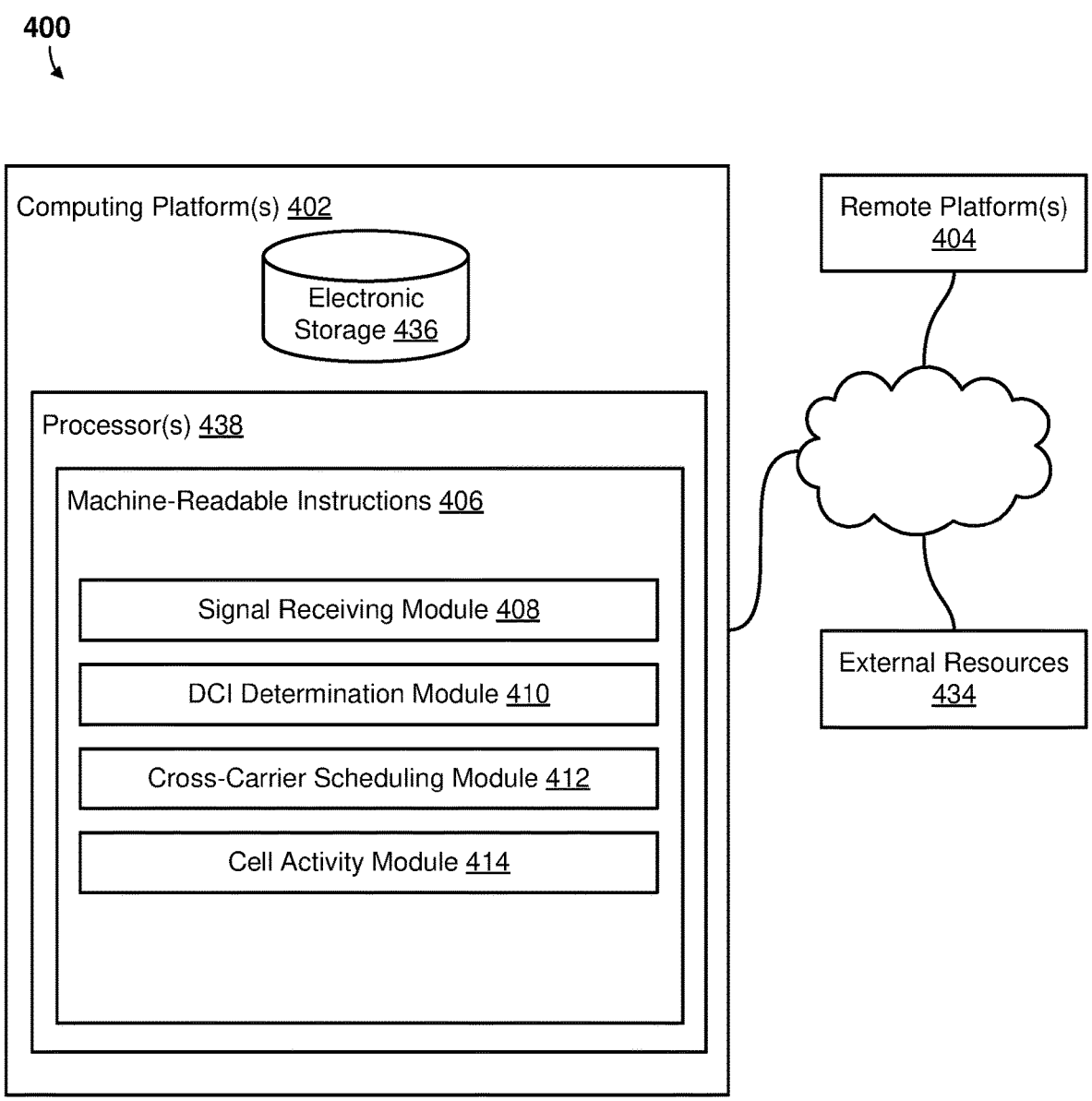
FIG. 4A shows a component block diagram of an example system configured for managing cross-carrier scheduling by a processor of a wireless device.

FIG. 4A shows a component block diagram of an example system configured for managing paging monitoring by a processor of a wireless device. In some implementations, the system 400 may include one or more computing platforms 402 or one or more remote platforms 404. With reference to FIGS. 1-4, the computing platform(s) 402 may include a wireless device (for example, the wireless device 120a-120e, 200, 320). Remote platform(s) 404 may include a base station (for example, the base station 110a-110d, 350) or a wireless device (for example, the wireless device 120a-120e, 200, 320). External resources 434 may include a remote computing device, such as a server, that may provide data, a service, or another resource for computing platform(s) 402 or remote platform(s) 404.

Computing platform(s) 402 may be configured by machine-readable instructions 406. Machine-readable instructions 406 may include one or more instruction modules. The instruction modules may include computer program modules. The instruction modules may include one or more of a signal receiving module 408, a DCI determination module 410, cross-carrier scheduling module 412, cell activity module 414, or other instruction modules.

The signal receiving module 408 may be configured to receive DCI from a primary cell or secondary cell. The signal receiving module 408 may be configured to monitor one or more of DCI formats 0_1, 0_2, 1_1, and 1_2 on the secondary cell. The signal receiving module 408 may be configured to monitor one or more of DCI formats 0_0 and 1_0 on the secondary cell and monitoring common search spaces corresponding to the DCI formats 0_0 and 1_0. The signal receiving module 408 may be configured to monitor, or not to monitor, cell radio network temporary identifier (C-RNTI) of the primary cell. The signal receiving module 408 may be configured to monitor one or more search spaces, such as common search spaces, on the primary cell or secondary cell.

The DCI determination module 410 may be configured to determine whether a DCI received from a secondary cell schedules communications on a primary cell. The DCI determination module 410 may be configured to determine cross carrier scheduling of communications on the primary cell based on the DCI received from the secondary cell. The DCI determination module 410 may be configured to determine whether the DCI from the secondary cell includes a DCI format configured to schedule communications on the primary cell. The DCI determination module 410 may be configured to determine whether the DCI from the secondary cell includes a CIF configured to schedule communications on the primary cell. The DCI determination module 410 may be configured to determine whether the CIF schedules communications on one of a physical downlink shared channel (PDSCH) or a physical uplink shared channel (PUSCH) of the primary cell. The DCI determination module 410 may be configured to determine whether a DCI schedules a retransmission on the primary cell or the secondary cell.

The cross-carrier scheduling module 412 may be configured to perform cross-carrier communications. The cross-carrier scheduling module 412 may be configured to conduct unicast communications on the primary cell or the secondary cell. The cross-carrier scheduling module 412 may be configured to schedule, transmit, or receive a retransmission on the primary cell or the secondary cell.

The cell activity module 414 may be configured to determine whether the secondary cell has been deactivated. The cell activity module 414 may be configured to identify a designation of a secondary cell as a PSCell.

Figure 4B:
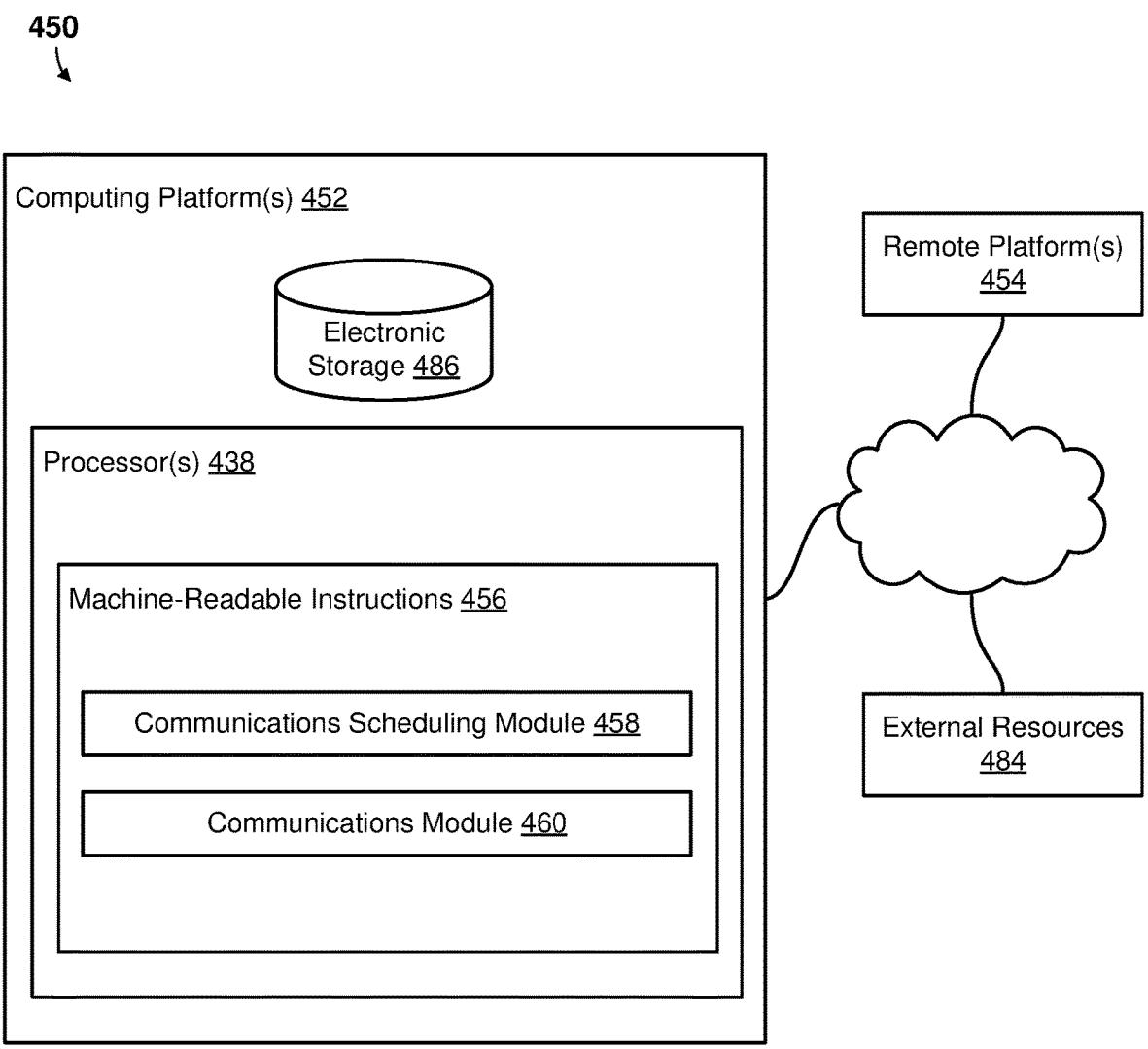
FIG. 4B shows a component block diagram of an example system configured for managing cross-carrier scheduling by a processor of a network device.

FIG. 4B shows a component block diagram of an example system configured for managing paging monitoring on the network side by a processor of a network device. In some implementations, the system 450 may include one or more computing platforms 452 or one or more remote platforms 454. With reference to FIGS. 1-4B, the computing platform(s) 452 may include a network device (for example, the base station 110a-110d). Remote platform(s) 454 may include a base station (for example, the base station 110a-110d) or a wireless device (for example, the wireless device 120a-120e, 200, 320). External resources 484 may include a remote computing device, such as a server, that may provide data, as service, or another resource for computing platform(s) 452 or remote platform(s) 454.

Computing platform(s) 452 may be configured by machine-readable instructions 456. Machine-readable instructions 456 may include one or more instruction modules. The instruction modules may include computer program modules. The instruction modules may include one or more of a communications scheduling module 458, a communications module 460, or other instruction modules.

The communications scheduling module 458 may be configured to schedule communications on primary cell in DCI of a secondary cell. The communications scheduling module 458 may be configured to schedule communications on the primary cell in a DCI format configured to schedule communications on the primary cell.

The communications module 416 may be configured to perform cross-carrier scheduling of communications on the primary cell based on the DCI of the secondary cell.

Figure 5:
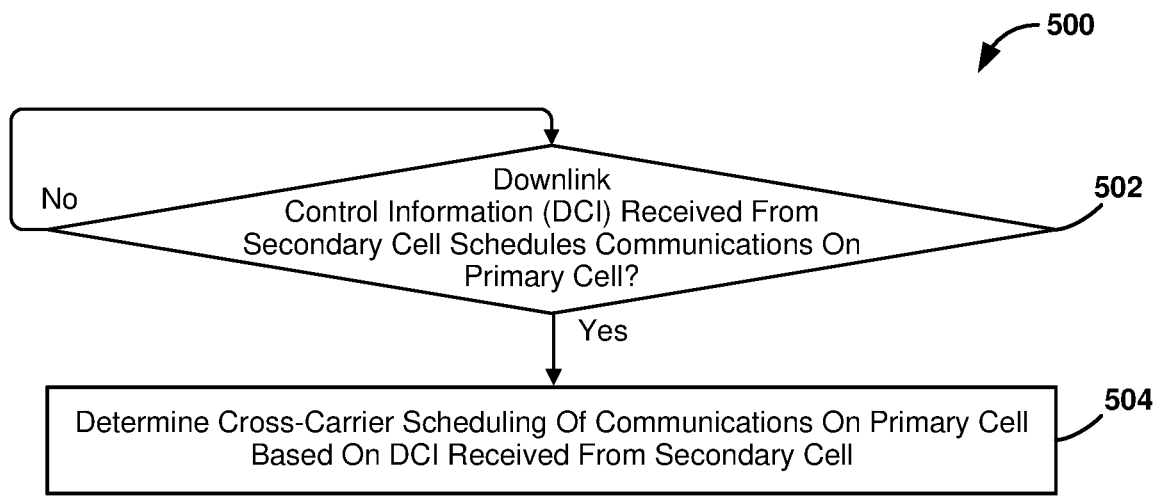
FIG. 5 shows a process flow diagram of an example method of managing cross-carrier scheduling by a processor of a wireless device.

FIG. 5 shows a process flow diagram of an example method 500 for managing cross-carrier scheduling by a processor of a wireless device. With reference to FIGS. 1-5, the method 500 may be implemented by a processor (such as 212, 216, 252, or 260) of a wireless device (such as the wireless device 120a-120e, 200, 320).

In determination block 502, the processor may determine whether downlink control information (DCI) received from a secondary cell schedules communications on a primary cell. In some implementations, the processor may monitor a control channel of the secondary cell (such as a PDCCH) for the DCI that schedules communications on the primary cell.

In response to determining that the DCI received from a secondary cell does not schedule communications on a primary cell (i.e., determination block 502="No") the processor may again perform the operations of determination block 502 as described (for example, after receiving additional DCI from the secondary cell).

In response to determining that the DCI received from a secondary cell schedules communications on a primary cell (i.e., determination block 502="Yes"), the processor may determine cross-carrier scheduling of communications on the primary cell in response to determining that the DCI received from the secondary cell schedules communications on the primary cell in block 504. In some implementations, the processor may determine schedules of unicast communications on the primary cell based on the DCI received from the secondary cell. In some implementations, the unicast communications may include uplink communications (such as via a PUSCH on the primary cell) or downlink communications (such as via a PDSCH on the primary cell).

FIGS. 6A-6K show process flow diagrams of example operations 600a-600k that may be performed as part of the method 500 for managing cross-carrier scheduling by a processor of a wireless device. With reference to FIGS. 1-6K, the operations 600a-600k may be implemented by a processor (such as 212, 216, 252, or 260) of a wireless device (such as the wireless device 120a-120e, 200, 320).

Figure 6A:
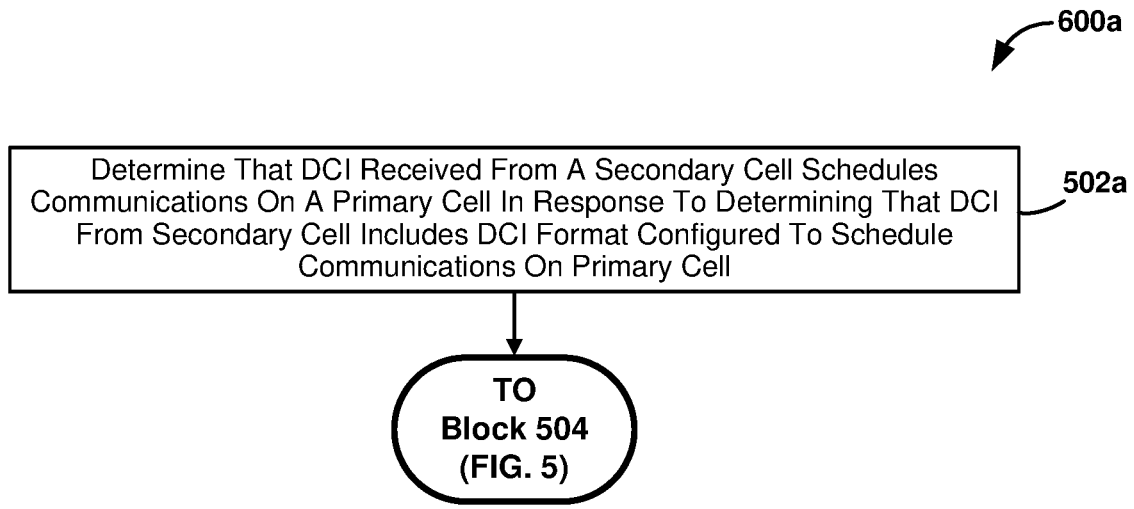
FIGS. 6A-6K show process flow diagrams of example operations that may be performed as part of the method for managing cross-carrier scheduling by a processor of a wireless device.

With reference to method 600a shown in FIG. 6A, in block 502a, the processor may determine that the DCI received from the secondary cell schedules communications on the primary cell in response to determining that the DCI from the secondary cell includes a DCI format configured to schedule communications on the primary cell. The processor may then perform the operations of block 504 (FIG. 5) to determine cross-carrier scheduling of communications on the primary cell based on the DCI received from the secondary cell as described.

Figure 6B:
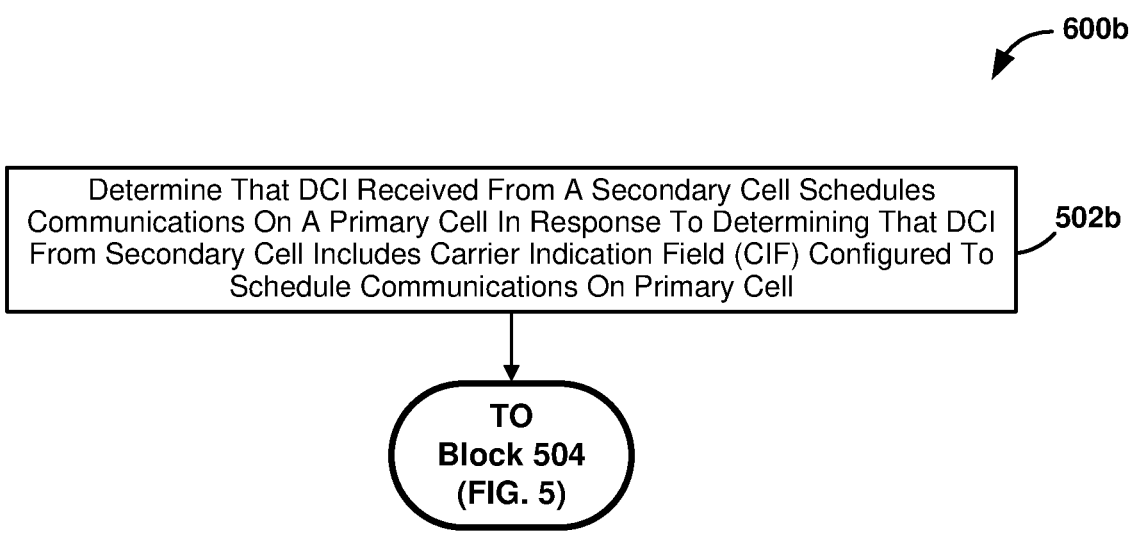

With reference to method 600b shown in FIG. 6B, in block 502b, the processor may determine that the DCI received from the secondary cell schedules communications on the primary cell in response to determining that the DCI from the secondary cell includes a CIF configured to schedule communications on the primary cell. In some implementations, determining whether the DCI received from the secondary cell schedules communications on a primary cell may include determining that the DCI from the secondary cell includes a CIF configured to schedule communications on the primary cell.

The processor may proceed to perform the operations of block 504 (FIG. 5) to determine cross-carrier scheduling of communications on the primary cell based on the DCI received from the secondary cell as described.

Figure 6C:
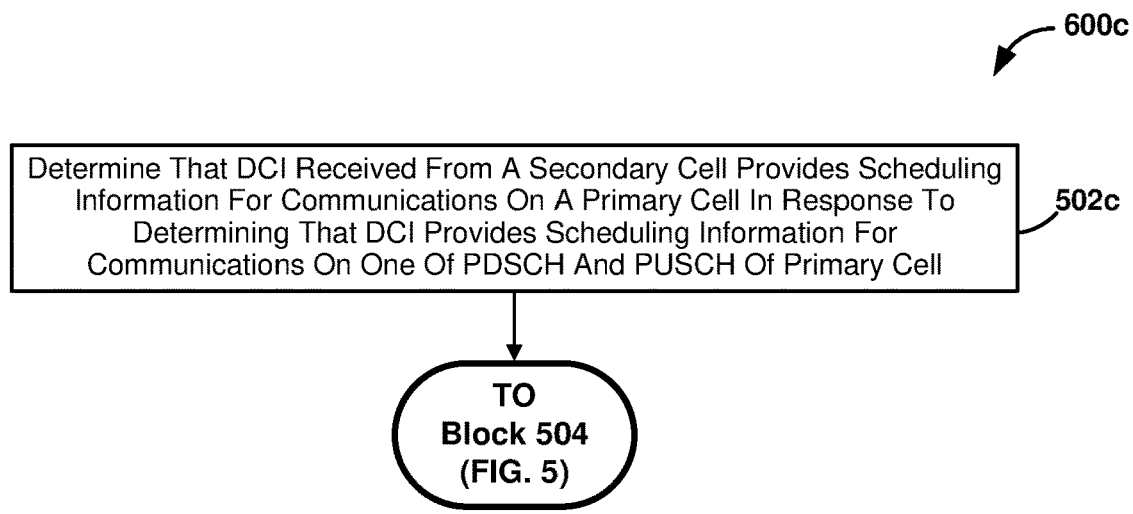

With reference to method 600c shown in FIG. 6C, in block 502c, the processor may determine that the DCI received from the secondary cell provides scheduling information for communications on the primary cell in response to determining that the CIF schedules communications on one of a physical downlink shared channel (PDSCH) or a physical uplink shared channel (PUSCH) of the primary cell. In some implementations, determining that the DCI received from the secondary cell includes a CIF configured to schedule communications on the primary cell may include determining that the CIF includes a value indicating the scheduled cell is the primary cell.

The processor may proceed to perform the operations of block 504 (FIG. 5) as described.

Figure 6D:
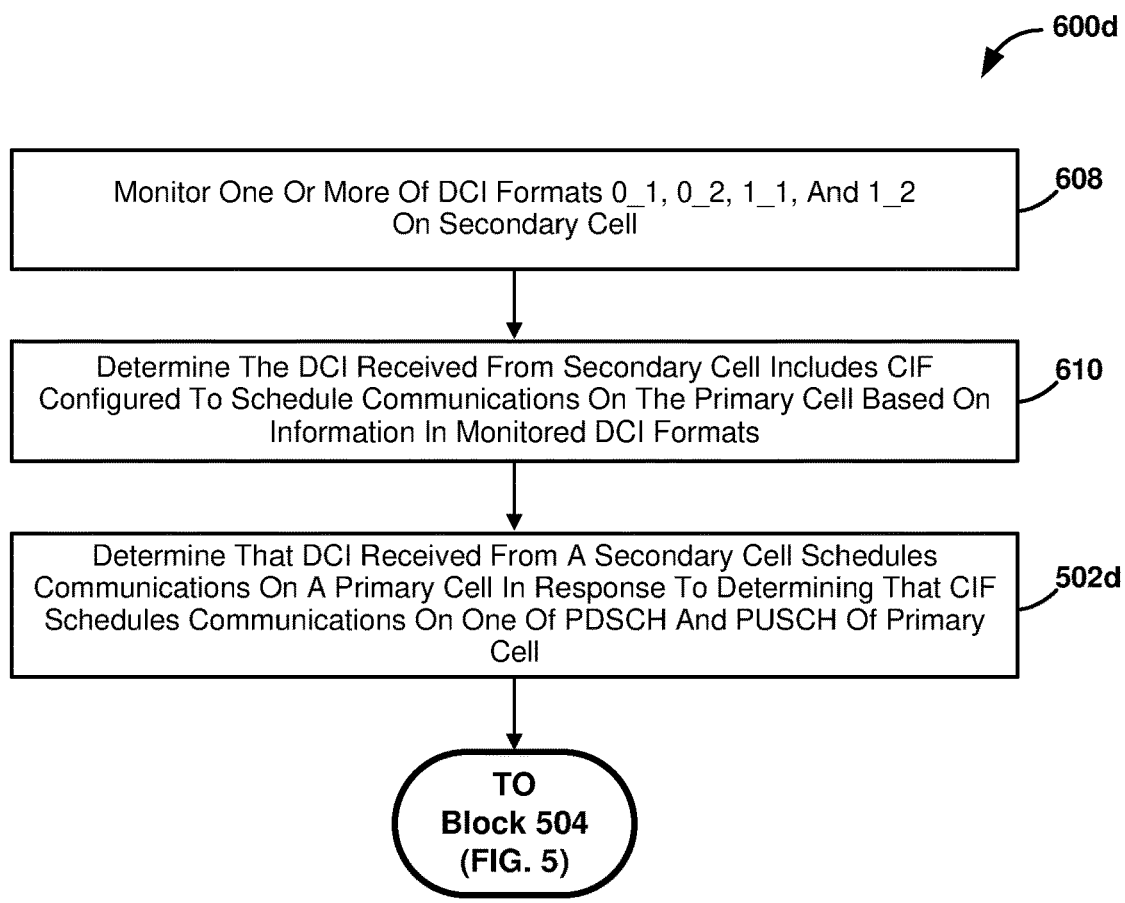

With reference to method 600d shown in FIG. 6D, in block 608, the processor may monitor one or more of DCI formats 0_1, 0_2, 1_1, and 1_2 on the secondary cell.

In block 610, the processor may determine that the DCI received from the secondary cell includes the CIF configured to schedule communications on the primary cell based on the information in the monitored DCI formats.

In block 502d, the processor may determine that the DCI received from the secondary cell schedules communications on the primary cell in response to determining that the CIF schedules communications on one of a physical downlink shared channel (PDSCH) or a physical uplink shared channel (PUSCH) of the primary cell.

The processor may proceed to perform the operations of block 504 (FIG. 5) as described.

Figure 6E:
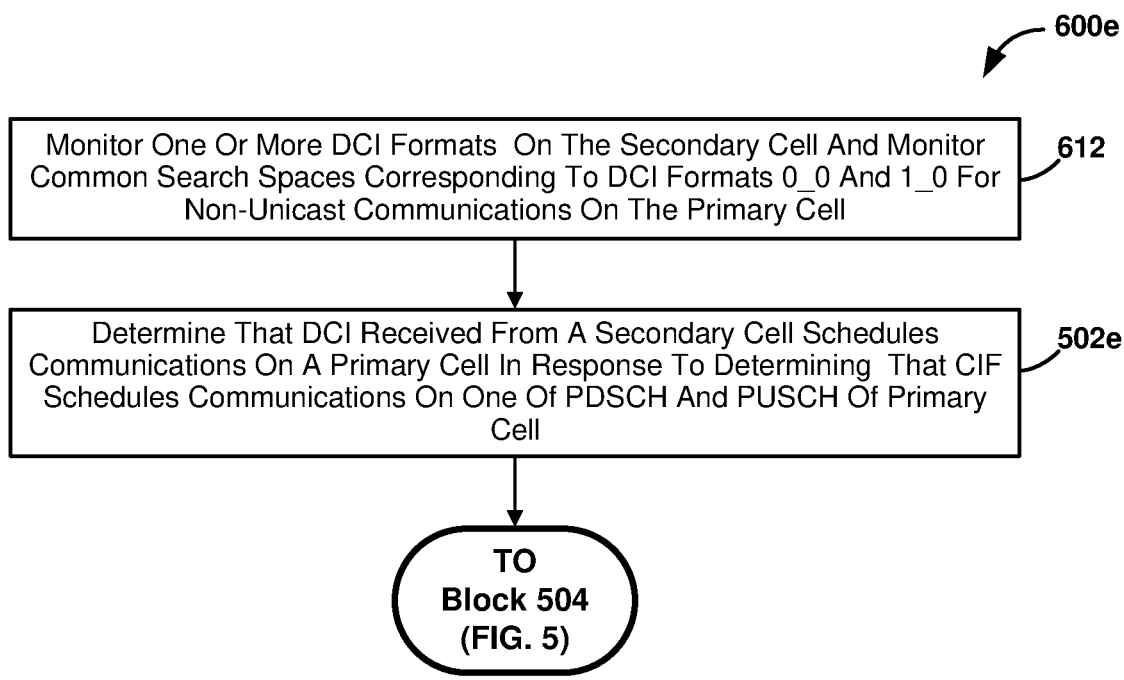

With reference to method 600e shown in FIG. 6E, in block 612, the processor may monitor one or more DCI formats on the secondary cell and monitor common search spaces corresponding to DCI formats 0_0 and 1_0 for non-unicast communications on the primary cell. In some implementations, the common search spaces may include, for example, Type 0, 0A, or 2 common search space sets.

In block 502e, the processor may determine that the DCI received from the secondary cell schedules communications on the primary cell in response to determining that the CIF schedules communications on one of a physical downlink shared channel (PDSCH) or a physical uplink shared channel (PUSCH) of the primary cell.

The processor may proceed to perform the operations of block 504 (FIG. 5) as described.

Figure 6F:
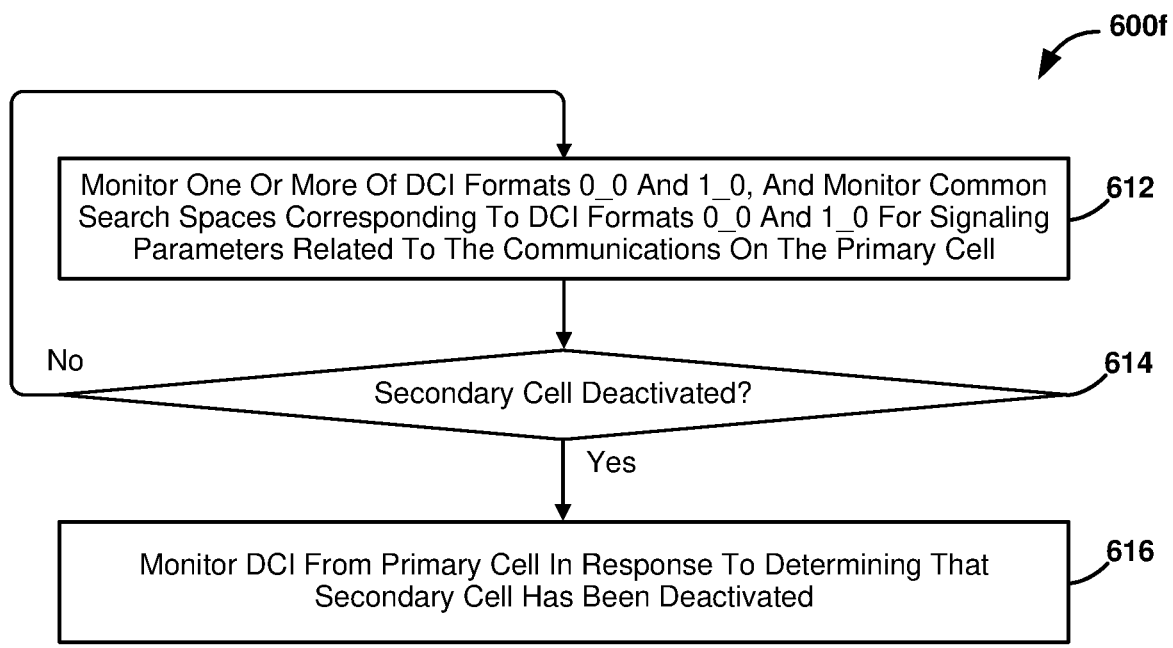

With reference to method 600f shown in FIG. 6F, in block 612, the processor may monitor one or more of DCI formats 0_0 and 1_0 on the secondary cell and monitor common search spaces corresponding to the DCI formats 0_0 and 1_0 for signaling parameters related to the communications on the primary cell. In some implementations, the common search spaces may include, for example, Type 0, 0A, or 2 common search space sets.

In block 614, the processor may determine whether the secondary cell has been deactivated. For example, the processor may determine that the secondary cell has been deactivated in response to determining that one or more signals from the secondary cell can no longer be detected. As another example, the processor may determine that the secondary cell has been deactivated in response to receiving a message or another indication from the primary cell that the secondary cell has been deactivated.

In response to determining that the secondary cell has not been deactivated (i.e., determination block 614="No"), processor may again perform the operations of block 612 as described.

In response to determining that the secondary cell has been deactivated (i.e., determination block 614="Yes"), the processor may monitor a DCI from the primary cell in block 616. In some implementations, the processor may be configured to monitor a control channel (such as a PDCCH) on the primary cell in response to determining that the secondary cell has been deactivated.

Figure 6G:
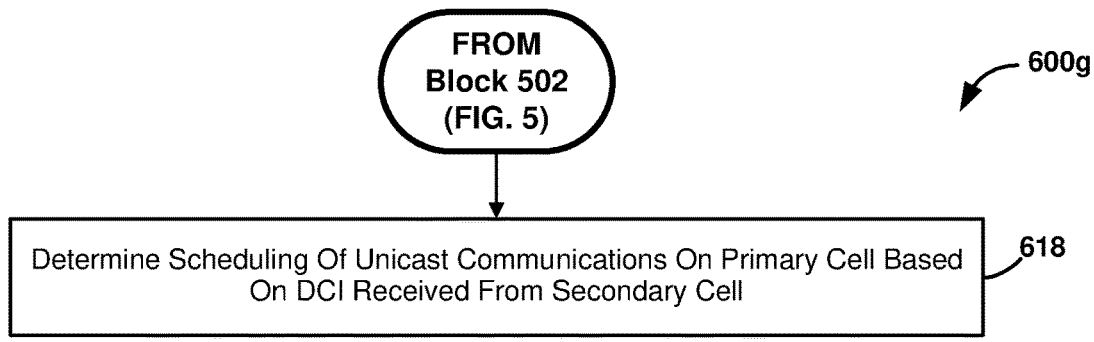

With reference to method 600g shown in FIG. 6G, in response to determining that the DCI received from a secondary cell schedules communications on a primary cell (i.e., determination block 502="Yes") (FIG. 5), the processor may determine the scheduling of unicast communications on the primary cell based on the DCI received from the secondary cell in block 618.

Figure 6H:
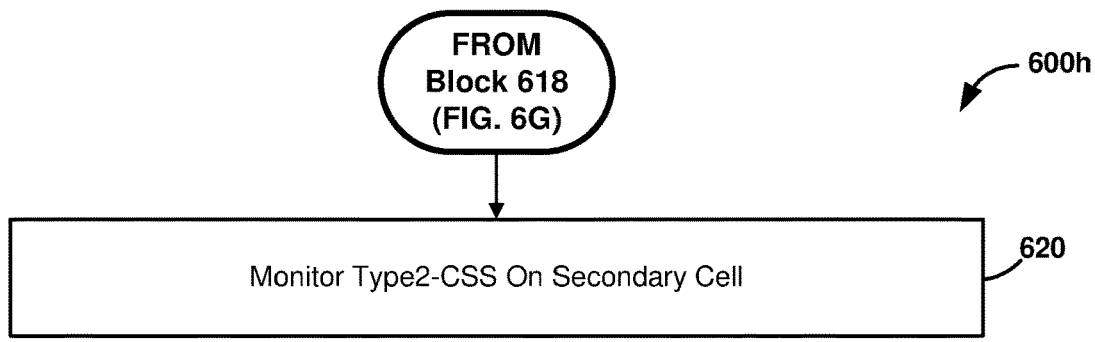

With reference to method 600h shown in FIG. 6H, following the operations of block 618 (FIG. 6G), the processor may monitor the Type 1 common search space (Type1-CSS) on the secondary cell in block 620. In some implementations, the wireless device may monitor the Type1-CSS on the secondary cell when the secondary cell is configured to schedule unicast communications on the primary cell.

Figure 6I:
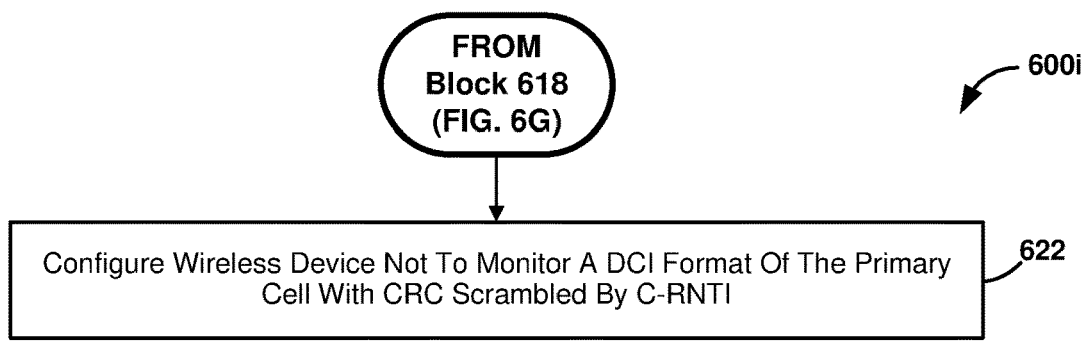

With reference to method 600i shown in FIG. 6I, following the operations of block 618 (FIG. 6G), the processor may configure the wireless device not to monitor a DCI format of the primary cell with a cyclic redundancy check (CRC) scrambled by the C-RNTI of in block 622. In some implementations, the processor may monitor a Type 1 common search space (Type1-CSS) on the primary cell. In some implementations, Type 1-CSS may be configured by information such as ra-SearchSpace in the PDCCH-ConfigCommon for the primary cell. In such implementations, the processor may not monitor the DCI format of the primary cell with a CRC scrambled by the C-RNTI (except for information such as the PDCCH-order) on the Type1-CSS in the primary cell when the processor monitors the control channel on the secondary cell for scheduling communications on the primary cell.

Figure 6J:
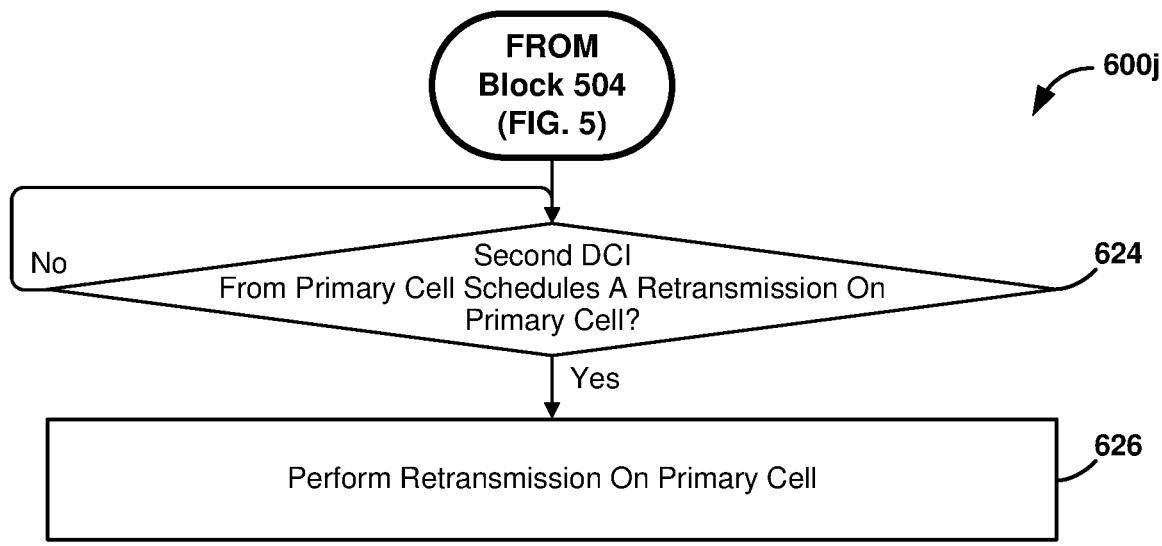

With reference to method 600j shown in FIG. 6J, following the operations of block 504 (FIG. 5), the processor may determine whether a second DCI from the primary cell schedules a retransmission on the primary cell in determination block 624.

In response to determining that a second DCI from the primary cell does not schedule a retransmission on the primary cell in determination block (i.e., determination block 624="No"), the processor may repeat the operations of determination block 624.

In response to determining that a second DCI from the primary cell schedules a retransmission on the primary cell in determination block (i.e., determination block 624="Yes"), the processor may perform the retransmission on the primary cell in block 626. In some implementations, when the initial transmission of a PDSCH or a PUSCH has been scheduled on the primary cell via the PDCCH on the secondary cell, the retransmission via the PDSCH or the PUSCH may be scheduled by DCI format 0_0 or 1_0 on the primary cell, and the processor may use the schedule information to receive the retransmission from the primary cell.

Figure 6K:
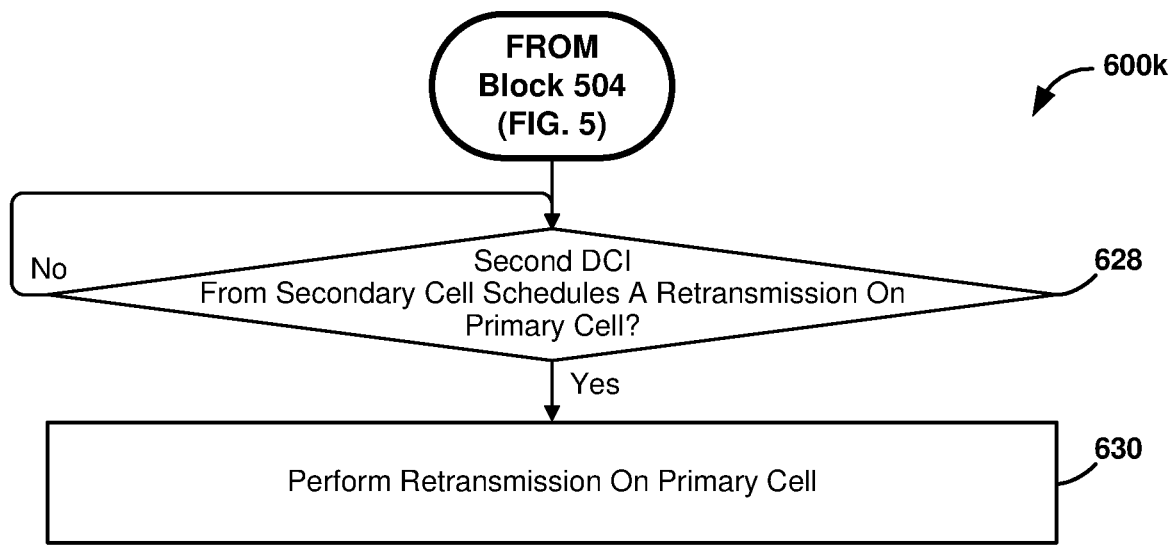

With reference to method 600k shown in FIG. 6K, following the operations of block 504 (FIG. 5), the processor may determine whether a second DCI from the secondary cell schedules a retransmission on the primary cell in determination block 628.

In response to determining that a second DCI from the secondary cell does not schedule a retransmission on the primary cell in determination block (i.e., determination block 628="No"), the processor may repeat the operations of determination block 628.

In response to determining that a second DCI from the secondary cell schedules a retransmission on the primary cell in determination block (i.e., determination block 628="Yes"), the processor may receive the retransmission on the primary cell in block 630. In some implementations, when the initial transmission of a PDSCH or a PUSCH has been scheduled on the primary cell via the PDCCH on the secondary cell, the retransmission via the PDSCH or the PUSCH may be scheduled by DCI format 0_0 or 1_0 on the secondary cell, and the processor may use the schedule information to receive the retransmission from the primary cell. In some implementations, the processor may prevent or ignore scheduling the retransmission by the primary cell (for example, by monitoring the DCI format 0_0 or 1_0 on the primary cell).

Figure 7:
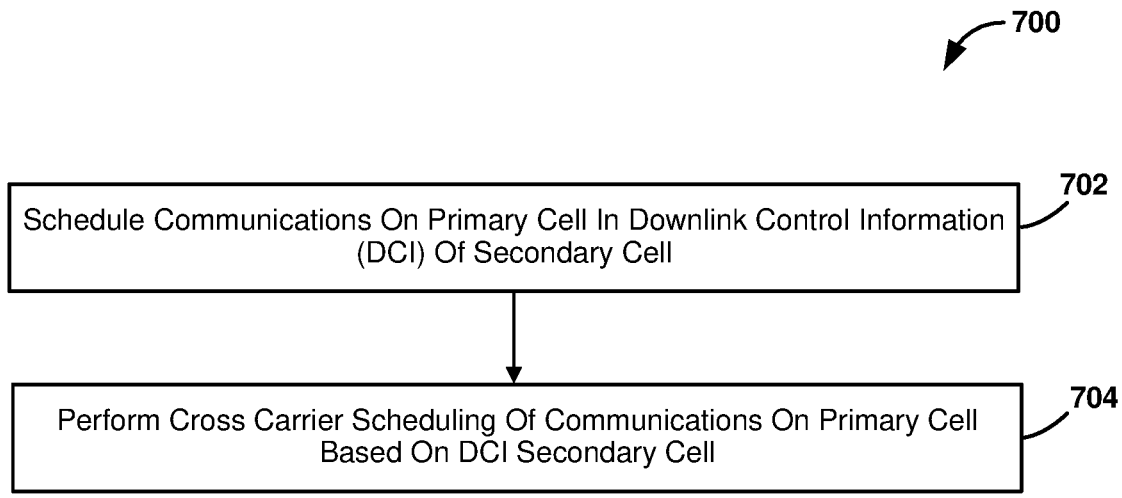
FIG. 7 shows a process flow diagram of an example method of managing cross-carrier scheduling by a processor of a network device.

FIG. 7 shows a process flow diagram of an example method 700 for managing cross-carrier scheduling by a processor of a network device. With reference to FIGS. 1-7, the method 700 may be implemented by a processor (such as 212, 216, 252, or 260) of a network device (such as the base station 110a, 110b, 110c, BS 110d).

In block 702, the processor may schedule communications on a primary cell in DCI of a secondary cell. In some implementations, the DCI of the secondary cell may include a CIF configured to schedule communications on the primary cell. In some implementations, the CIF may schedule communications on one of a physical downlink shared channel (PDSCH) or a physical uplink shared channel (PUSCH) of the primary cell.

In block 704, the processor may perform cross-carrier scheduling of communications on the primary cell based on the DCI of the secondary cell.

Figure 8:
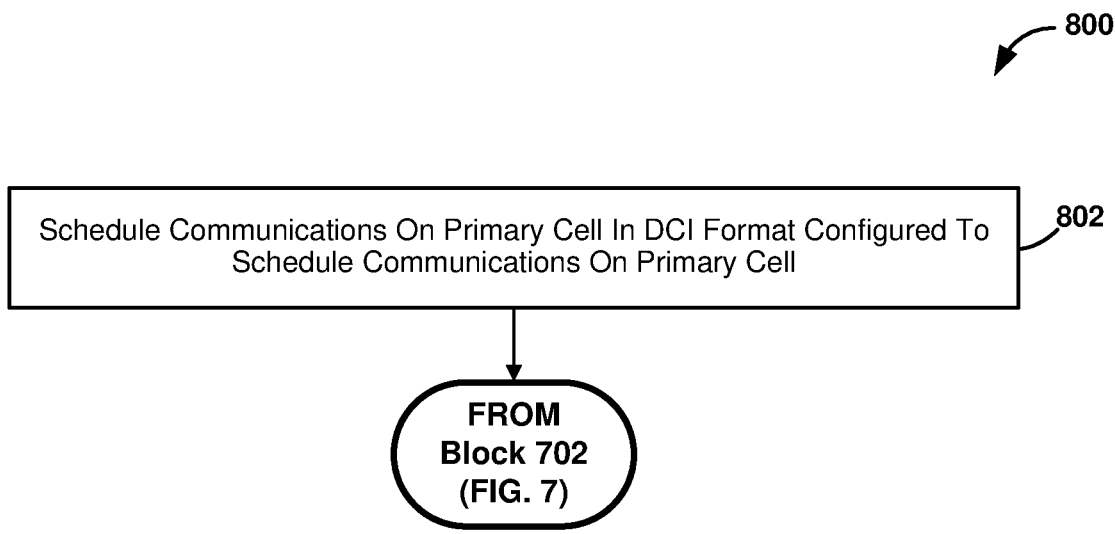
FIG. 8 shows a process flow diagram of example operations that may be performed as part of the method for managing cross-carrier scheduling by a processor of a network device.

FIG. 8 shows a process flow diagrams of example operations 800 that may be performed as part of the method 700 for managing cross-carrier scheduling by a processor of a wireless device. With reference to FIGS. 1-8, the operations 600a-600k may be implemented by a processor (such as 212, 216, 252, or 260) of a network device (such as the base station 110a, 110b, 110c, BS 110d).

In block 802, the processor may schedule communications on the primary cell in a DCI format configured to schedule communications on the primary cell. In some implementations, the DCI from the secondary cell may include a DCI format (such as DCI format 0_0 or 1_0) configured to schedule communications on the primary cell.

The processor may proceed to perform the operations of block 702 (FIG. 7) as described.

Figure 9:
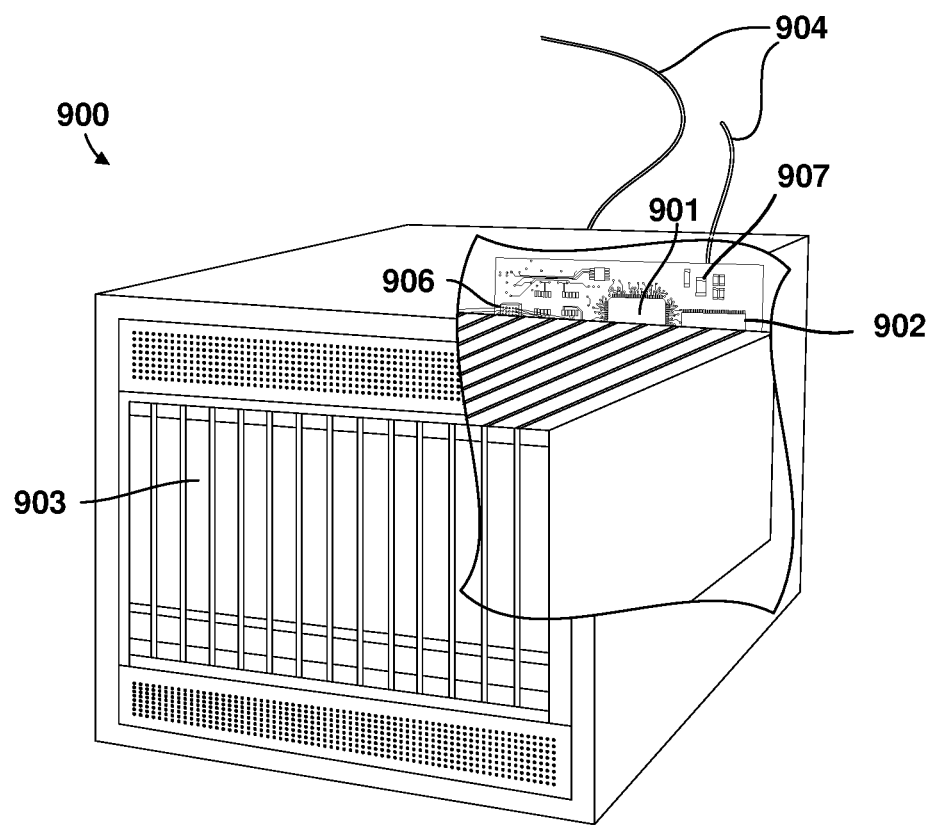
FIG. 9 shows a component block diagram of an example network computing device.

FIG. 9 shows a component block diagram of an example network computing device 900. In some implementations, the wireless network computing device 900 may function as a network device of a communication network, such as a base station for example, the base station 110a-110d). The network computing device 900 may include at least the components illustrated in FIG. 9. With reference to FIGS. 1-9, the network computing device 900 may typically include a processor 901 coupled to volatile memory 902 and a large capacity nonvolatile memory, such as a disk drive 903. The network computing device 900 also may include a peripheral memory access device such as a floppy disc drive, compact disc (CD) or digital video disc (DVD) drive 906 coupled to the processor 901. The network computing device 900 also may include network access ports 904 (or interfaces) coupled to the processor 901 for establishing data connections with a network, such as the Internet or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
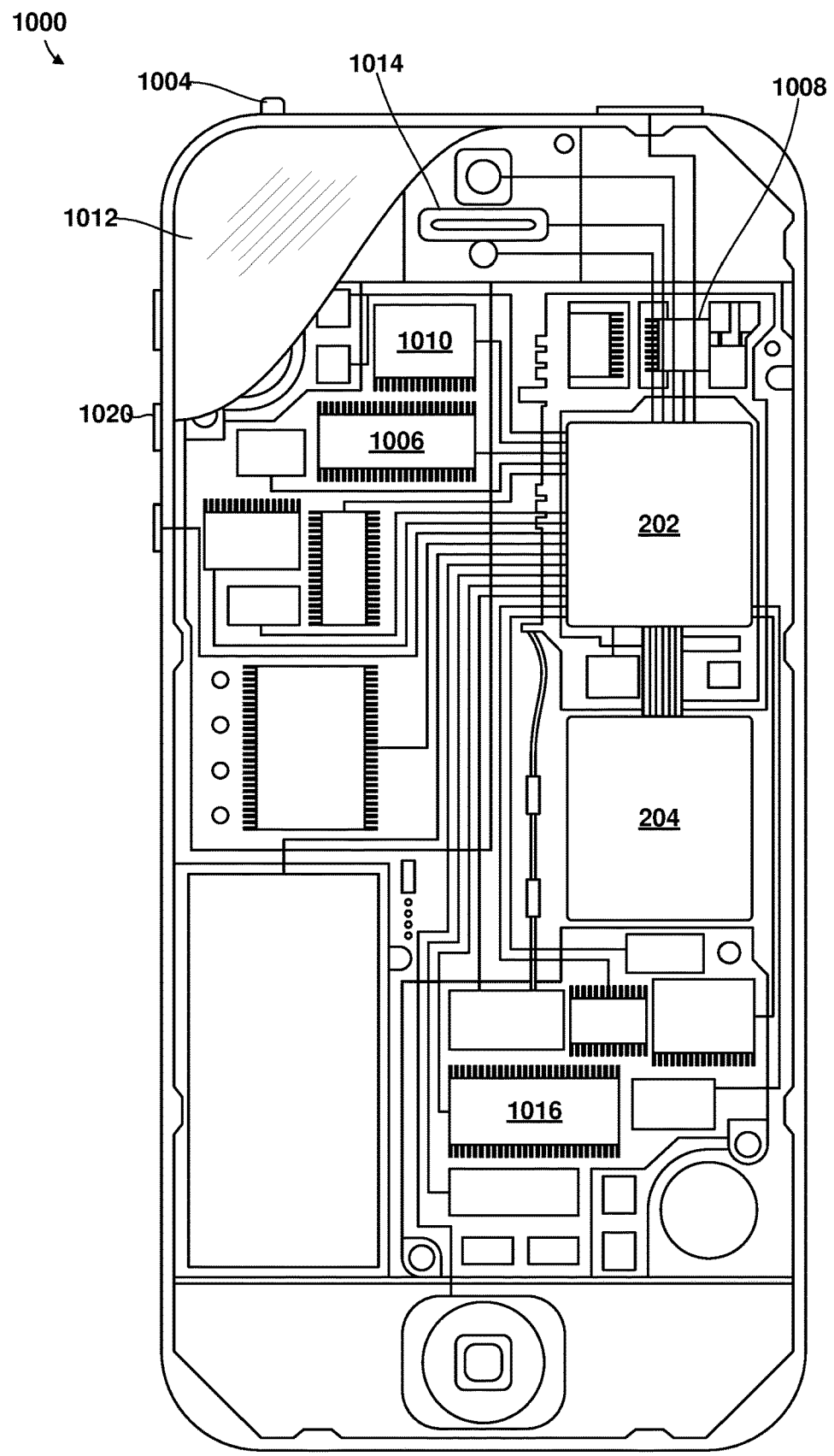
FIG. 10 shows a component block diagram of an example wireless device.

FIG. 10 shows a component block diagram of an example wireless device. In some implementations, the wireless device may be implemented as a variety of wireless devices (for example, the wireless device 120a-120e, 200, 320), an example of which is illustrated in FIG. 10 in the form of a smartphone 1000. The smartphone 1000 may include a first SOC 202 (for example, a SOC-CPU) coupled to a second SOC 204 (for example, a 5G capable SOC). The first and second SOCs 202, 204 may be coupled to internal memory 1006, 1016, a display 1012, and to a speaker 1014. Additionally, the smartphone 1000 may include an antenna 1004 for sending and receiving electromagnetic radiation that may be connected to a wireless data link or cellular telephone transceiver 1008 coupled to one or more processors in the first or second SOCs 202, 204. Smartphones 1000 typically also include menu selection buttons or rocker switches 1020 for receiving user inputs.

A typical smartphone 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1008 and CODEC 1010 may include a digital signal processor (DSP) circuit (not shown separately).

The processors of the wireless network computing device 900 and the smart phone 1000 may be any programmable microprocessor, microcomputer or multiple processor chip or chips that can be configured by software instructions (applications) to perform a variety of functions, including the functions of the various implementations. In some mobile devices, multiple processors may be provided, such as one processor within an SOC 204 dedicated to wireless communication functions and one processor within an SOC 202 dedicated to running other applications. Typically, software applications may be stored in the memory 1006, 1016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing cross-carrier scheduling by a processor of a wireless device, comprising:
   receiving downlink control information (DCI) from a secondary cell that schedules communications on a primary cell;
   implementing cross-carrier scheduling of communications on the primary cell;
   receiving a second DCI from the secondary cell that schedules a retransmission on the primary cell; and
   receiving the retransmission on the primary cell associated with receiving the second DCI from the secondary cell that schedules the retransmission on the primary cell.

2. The method of claim 1, wherein:
   the DCI from the secondary cell comprises a DCI format configured to schedule communications on the primary cell; and
   implementing cross-carrier scheduling of communications on the primary cell is associated with receiving the DCI comprising the DCI format configured to schedule communications on the primary cell.

3. The method of claim 1, wherein:
   the DCI from the secondary cell comprises a Carrier Indicator Field (CIF) configured to schedule communications on the primary cell; and
   implementing cross-carrier scheduling of communications on the primary cell is associated with receiving the DCI comprising the CIF configured to schedule communications on the primary cell.

4. The method of claim 3, wherein:
   the CIF configured to schedule communications on the primary cell comprises one or more of DCI formats 0_1, 0_2, 1_1, and 1_2 on the secondary cell; and
   implementing cross-carrier scheduling of communications on the primary cell is associated with receiving the CIF configured to schedule communications on the primary cell comprising the one or more of DCI formats 0_1, 0_2, 1_1, and 1_2 on the secondary cell.

5. The method of claim 1, wherein:
   the DCI provides scheduling information for communications on one of a physical downlink shared channel (PDSCH) or a physical uplink shared channel (PUSCH) of the primary cell; and implementing cross-carrier scheduling of communications on the primary cell is associated with receiving the DCI comprising the scheduling information for communications on one of a PDSCH or a PUSCH of the primary cell.

6. The method of claim 1, wherein receiving the DCI from the secondary cell that schedules communications on the primary cell comprises:
monitoring a control channel of the secondary cell for the DCI that schedules communications on the primary cell; and
receiving the DCI from a secondary cell that schedules communications on the primary cell.

7. The method of claim 1, further comprising:
receiving DCI from the primary cell that schedules communications on the primary cell; and
performing scheduling of communications on the primary cell associated with receiving the DCI from the primary cell that schedules communications on the primary cell.

8. The method of claim 7, further comprising:
monitoring a DCI format of the primary cell with a CRC scrambled by a cell radio network temporary identifier (C-RNTI) at a first time; and
monitoring a DCI format of the secondary cell with a CRC scrambled by a C-RNTI at a second time,
wherein receiving DCI from the primary cell that schedules communications on the primary cell is associated with the monitoring of the DCI format of the primary cell with the CRC scrambled by the C-RNTI at the first time, and
wherein receiving DCI from a secondary cell that schedules communications on a primary cell is associated with the monitoring of the DCI format of the secondary cell with the CRC scrambled by the C-RNTI at the second time.

9. The method of claim 1, wherein implementing cross-carrier scheduling of communications on the primary cell comprises receiving unicast communications on the primary cell associated with receiving the DCI from the secondary cell that schedules communications on the primary cell.

10. The method of claim 9, wherein receiving the DCI from the secondary cell that schedules communications on the primary cell comprises monitoring a Type 1 common search space (Type1-CSS) on the secondary cell.

11. The method of claim 1, further comprising:
monitoring a DCI in a Type3-CSS or a wireless device-specific search space (USS) on the primary cell; and
receiving unicast communications on the primary cell associated with monitoring the DCI in the Type3-CSS or the USS on the primary cell.

12. The method of claim 11, wherein:
monitoring a DCI in a Type3-CSS or a wireless device-specific search space (USS) on the primary cell comprises receiving a second DCI comprising a DCI format 0_0 or a DCI format 1_0 with the CRC scrambled by the C-RNTI in the Type3-CSS or the USS on the primary cell, and
receiving unicast communications on the primary cell associated with monitoring the DCI format 0_0 or the DCI format 1_0 with the CRC scrambled by a C-RNTI in the Type3-CSS or the USS on the primary cell comprises receiving a retransmission on the primary cell associated with receiving the second DCI comprising the DCI format 0_0 or the DCI format 1_0 with the CRC scrambled by the C-RNTI in the Type3-CSS or the USS on the primary cell.

13. The method of claim 1, further comprising:
monitoring one or more DCI formats on the secondary cell and monitoring common search spaces corresponding to DCI formats 0_0 and 1_0 for non-unicast communications on the primary cell.

14. The method of claim 1, further comprising:
receiving DCI from the secondary cell indicating that the secondary cell has been deactivated; and
monitoring a DCI from the primary cell associated with receiving the DCI from the secondary cell indicating that the secondary cell has been deactivated.

15. A wireless device, comprising:
a transceiver;
a memory; and
a processor coupled to the transceiver and the memory and configured with processor-executable instructions to perform operations comprising:
receiving downlink control information (DCI) from a secondary cell that schedules communications on a primary cell;
implementing cross-carrier scheduling of communications on the primary cell;
receiving a second DCI from the secondary cell that schedules a retransmission on the primary cell; and
receiving the retransmission on the primary cell associated with receiving the second DCI from the secondary cell that schedules the retransmission on the primary cell.

16. The wireless device of claim 15, wherein:
the DCI from the secondary cell comprises a DCI format configured to schedule communications on the primary cell; and
the processor is configured with processor-executable instructions to perform operations such that implementing cross-carrier scheduling of communications on the primary cell is associated with receiving the DCI comprising the DCI format configured to schedule communications on the primary cell.

17. The wireless device of claim 15, wherein:
the DCI from the secondary cell comprises a Carrier Indicator Field (CIF) configured to schedule communications on the primary cell; and
the processor is configured with processor-executable instructions to perform operations such that implementing cross-carrier scheduling of communications on the primary cell is associated with receiving the DCI comprising the CIF configured to schedule communications on the primary cell.

18. The wireless device of claim 17, wherein:
the CIF configured to schedule communications on the primary cell comprises one or more of DCI formats 0_1, 0_2, 1_1, and 1_2 on the secondary cell; and
the processor is configured with processor-executable instructions to perform operations such that implementing cross-carrier scheduling of communications on the primary cell is associated with receiving the CIF configured to schedule communications on the primary cell comprising the one or more of DCI formats 0_1, 0_2, 1_1, and 1_2 on the secondary cell.

19. The wireless device of claim 15, wherein:
the DCI provides scheduling information for communications on one of a physical downlink shared channel (PDSCH) or a physical uplink shared channel (PUSCH) of the primary cell; and
the processor is configured with processor-executable instructions to perform operations such that implementing cross-carrier scheduling of communications on the primary cell is associated with receiving the DCI comprising the scheduling information for communications on one of a PDSCH or a PUSCH of the primary cell.

20. The wireless device of claim 15, wherein the processor is configured with processor-executable instructions to perform operations such that receiving the DCI from the secondary cell that schedules communications on the primary cell comprises:
monitoring a control channel of the secondary cell for the DCI that schedules communications on the primary cell; and
receiving the DCI from a secondary cell that schedules communications on the primary cell.

21. The wireless device of claim 15, wherein the processor is configured with processor-executable instructions to perform operations further comprising:
receiving DCI from the primary cell that schedules communications on the primary cell; and
performing scheduling of communications on the primary cell associated with receiving the DCI from the primary cell that schedules communications on the primary cell.

22. The wireless device of claim 21, wherein the processor is configured with processor-executable instructions to perform operations further comprising:
monitoring a DCI format of the primary cell with a CRC scrambled by a cell radio network temporary identifier (C-RNTI) at a first time; and
monitoring a DCI format of the secondary cell with a CRC scrambled by a C-RNTI at a second time,
wherein receiving DCI from the primary cell that schedules communications on the primary cell is associated with the monitoring of the DCI format of the primary cell with the CRC scrambled by the C-RNTI at the first time, and
wherein receiving DCI from a secondary cell that schedules communications on a primary cell is associated with the monitoring of the DCI format of the secondary cell with the CRC scrambled by the C-RNTI at the second time.

23. The wireless device of claim 15, wherein the processor is configured with processor-executable instructions to perform operations such that implementing cross-carrier scheduling of communications on the primary cell comprises receiving unicast communications on the primary cell associated with receiving the DCI from the secondary cell that schedules communications on the primary cell.

24. The wireless device of claim 23, wherein the processor is configured with processor-executable instructions to perform operations such that receiving the DCI from the secondary cell that schedules communications on the primary cell comprises monitoring a Type 1 common search space (Type1-CSS) on the secondary cell.

25. The wireless device of claim 15, wherein the processor is configured with processor-executable instructions to perform operations further comprising:
monitoring a DCI in a Type3-CSS or a wireless device-specific search space (USS) on the primary cell; and
receiving unicast communications on the primary cell associated with monitoring the DCI in the Type3-CSS or the USS on the primary cell.

26. The wireless device of claim 25, wherein the processor is configured with processor-executable instructions to perform operations such that:
monitoring a DCI in a Type3-CSS or a wireless device-specific search space (USS) on the primary cell comprises receiving a second DCI comprising a DCI format 0_0 or a DCI format 1_0 with the CRC scrambled by the C-RNTI in the Type3-CSS or the USS on the primary cell, and
receiving unicast communications on the primary cell associated with monitoring the DCI format 0_0 or the DCI format 1_0 with the CRC scrambled by a C-RNTI in the Type3-CSS or the USS on the primary cell comprises receiving a retransmission on the primary cell associated with receiving the second DCI comprising the DCI format 0_0 or the DCI format 1_0 with the CRC scrambled by the C-RNTI in the Type3-CSS or the USS on the primary cell.

27. The wireless device of claim 15, wherein the processor is configured with processor-executable instructions to perform operations further comprising:
monitoring one or more DCI formats on the secondary cell and monitoring common search spaces corresponding to DCI formats 0_0 and 1_0 for non-unicast communications on the primary cell.

28. The wireless device of claim 15, wherein the processor is configured with processor-executable instructions to perform operations further comprising:
receiving DCI from the secondary cell indicating that the secondary cell has been deactivated; and
monitoring a DCI from the primary cell associated with receiving the DCI from the secondary cell indicating that the secondary cell has been deactivated.

* * * * *